United States Patent
Moriya et al.

(10) Patent No.: US 10,800,397 B2
(45) Date of Patent: Oct. 13, 2020

(54) CONTROL APPARATUS FOR HYBRID ELECTRIC VEHICLE

(71) Applicant: SUBARU CORPORATION, Tokyo (JP)

(72) Inventors: Fumiyuki Moriya, Tokyo (JP); Yuichi Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 298 days.

(21) Appl. No.: 15/958,776

(22) Filed: Apr. 20, 2018

(65) Prior Publication Data

US 2018/0354490 A1 Dec. 13, 2018

(30) Foreign Application Priority Data

Jun. 9, 2017 (JP) .................. 2017-113922

(51) Int. Cl.
*B60W 10/08* (2006.01)
*B60W 20/10* (2016.01)
(Continued)

(52) U.S. Cl.
CPC .............. *B60W 20/10* (2013.01); *B60K 6/48* (2013.01); *B60W 10/06* (2013.01); *B60W 10/08* (2013.01);
(Continued)

(58) Field of Classification Search
CPC ...... B60W 20/10; B60W 10/06; B60W 10/08; B60W 40/12; B60W 40/10; B60W 50/06;
(Continued)

(56) References Cited

U.S. PATENT DOCUMENTS

| 8,825,320 B2 * | 9/2014 | Heap | B60W 10/06 |
| | | | 701/55 |
| 8,845,481 B2 * | 9/2014 | Whitney | B60W 10/08 |
| | | | 477/5 |

(Continued)

FOREIGN PATENT DOCUMENTS

| JP | 2009-143501 A | 7/2009 |
| JP | 2013-018375 A | 1/2013 |

(Continued)

OTHER PUBLICATIONS

Japanese Office Action, dated Feb. 19, 2019, in Japanese Application No. 2017-113922 and English Translation thereof.

*Primary Examiner* — Dalena Tran
(74) *Attorney, Agent, or Firm* — McGinn I.P. Law Group, PLLC.

(57) ABSTRACT

A control apparatus for hybrid electric vehicle includes a shift operation detector and an electric motor controller. The shift operation detector detects an input of a shift operation. The electric motor controller controls an electric motor of the hybrid electric vehicle to generate motor torque directed to decreasing of torque difference, on a condition that: the input of the shift operation from a first stage into a second stage is detected by the shift operation detector; and first torque and second torque are different in magnitude from each other by the torque difference. The first torque is torque that is to be transmitted to a drive wheel during shifting of the automatic transmission. The second torque is torque that is to be transmitted to the drive wheel after the shifting of the automatic transmission is completed.

19 Claims, 10 Drawing Sheets

(51) Int. Cl.

| | | |
|---|---|---|
| *B60W 10/06* | (2006.01) | |
| *B60W 40/12* | (2012.01) | |
| *B60W 40/10* | (2012.01) | |
| *B60W 50/06* | (2006.01) | |
| *B60W 30/19* | (2012.01) | |
| *B60K 6/48* | (2007.10) | |
| *B60W 10/101* | (2012.01) | |
| *B60W 10/11* | (2012.01) | |
| *B60W 20/15* | (2016.01) | |

(52) U.S. Cl.
CPC .......... *B60W 10/101* (2013.01); *B60W 10/11* (2013.01); *B60W 20/15* (2016.01); *B60W 30/19* (2013.01); *B60W 40/10* (2013.01); *B60W 40/12* (2013.01); *B60W 50/06* (2013.01); *B60K 2006/4808* (2013.01); *B60W 2510/101* (2013.01); *B60W 2510/104* (2013.01); *B60W 2510/105* (2013.01); *B60W 2510/1015* (2013.01); *B60W 2520/105* (2013.01); *B60W 2540/10* (2013.01); *B60W 2540/16* (2013.01); *B60W 2710/0644* (2013.01); *B60W 2710/083* (2013.01); *Y10S 903/93* (2013.01)

(58) Field of Classification Search
CPC ............... Y10T 477/23; Y10T 477/675; Y10T 477/679; B60L 2240/423; B60L 2240/443
USPC ................. 701/22, 89; 477/3, 107, 77, 110; 903/945, 946; 475/5, 221, 295
See application file for complete search history.

(56) References Cited

U.S. PATENT DOCUMENTS

| | | | |
|---|---|---|---|
| 9,102,327 B2 * | 8/2015 | Tanishima | .............. B60L 58/25 |
| 9,440,640 B1 * | 9/2016 | Pritchard | .............. B60W 20/10 |
| 2009/0326778 A1 | 12/2009 | Soliman et al. | |
| 2016/0375890 A1 | 12/2016 | Saito et al. | |

FOREIGN PATENT DOCUMENTS

| | | |
|---|---|---|
| JP | 2015-025533 A | 2/2015 |
| JP | 2015-142494 A | 8/2015 |
| JP | 2017-013543 A | 1/2017 |

* cited by examiner

CONTROL APPARATUS FOR HYBRID ELECTRIC VEHICLE

CROSS-REFERENCE TO RELATED APPLICATIONS

The present application claims priority from Japanese Patent Application No. 2017-113922 filed on Jun. 9, 2017, the entire contents of which are hereby incorporated by reference.

BACKGROUND

The technology relates to a control apparatus for hybrid electric vehicle, in which the hybrid electric vehicle includes a drive wheel, an engine and an electric motor each serving as a drive source, and an automatic transmission having a manual shift mode that allows for shifting of the automatic transmission in accordance with an input of a shift operation.

Some automatic transmissions have a manual shift mode besides an automatic shift mode that automatically performs shifting of the automatic transmission in accordance with a driving state of a vehicle. The manual shift mode performs, when a shift operation is performed by a driver of the vehicle, downshift or upshift of a stage of the automatic transmission in accordance with the shift operation performed by the driver of the vehicle. The shift operation performed by the driver may be, for example but not limited to, an operation performed on a paddle switch directed to downshift or an operation performed on a paddle switch directed to upshift.

For example, Japanese Unexamined Patent Application Publication No. 2009-143501 discloses a technique that switches a control of a hybrid electric vehicle between a manual shift control and an automatic shift control in accordance with selection of the control performed by a driver. The hybrid electric vehicle includes an engine and a motor each serving as a power source, and an automatic transmission that transmits power from the power source to a drive wheel through shifting. The manual shift control causes shifting of the automatic transmission to be performed in accordance with an operation performed on a shifter. The automatic shift control automatically performs shifting of the automatic transmission in accordance with a traveling state of the vehicle.

SUMMARY

An aspect of the technology provides a control apparatus for hybrid electric vehicle. The control apparatus controls a hybrid electric vehicle that includes a drive wheel, an engine, an electric motor, and an automatic transmission. The engine and the electric motor both serve as drive sources. The automatic transmission has a manual shift mode that allows for shifting of the automatic transmission in accordance with an input of a shift operation. The control apparatus includes a shift operation detector and an electric motor controller. The shift operation detector is configured to detect the input of the shift operation. The electric motor controller is configured to control the electric motor to generate motor torque directed to decreasing of torque difference, on a condition that: the input of the shift operation from a first stage into a second stage is detected by the shift operation detector; and first torque and second torque are different in magnitude from each other by the torque difference. The first torque is torque that is to be transmitted to the drive wheel during shifting of the automatic transmission from the first stage into the second stage. The second torque is torque that is to be transmitted to the drive wheel after the shifting of the automatic transmission from the first stage into the second stage is completed.

An aspect of the technology provides a control apparatus for hybrid electric vehicle. The control apparatus controls a hybrid electric vehicle that includes a drive wheel, an engine, an electric motor, and an automatic transmission. The engine and the electric motor both serve as drive sources. The automatic transmission has a manual shift mode that allows for shifting of the automatic transmission in accordance with an input of a shift operation. The control apparatus includes circuitry and an electric motor controller. The circuitry is configured to detect the input of the shift operation. The electric motor controller is configured to control the electric motor to generate motor torque directed to decreasing of torque difference, on a condition that: the input of the shift operation from a first stage into a second stage is detected by the circuitry; and first torque and second torque are different in magnitude from each other by the torque difference. The first torque is torque that is to be transmitted to the drive wheel during shifting of the automatic transmission from the first stage into the second stage. The second torque is torque that is to be transmitted to the drive wheel after the shifting of the automatic transmission from the first stage into the second stage is completed.

DETAILED DESCRIPTION

Figure 1:
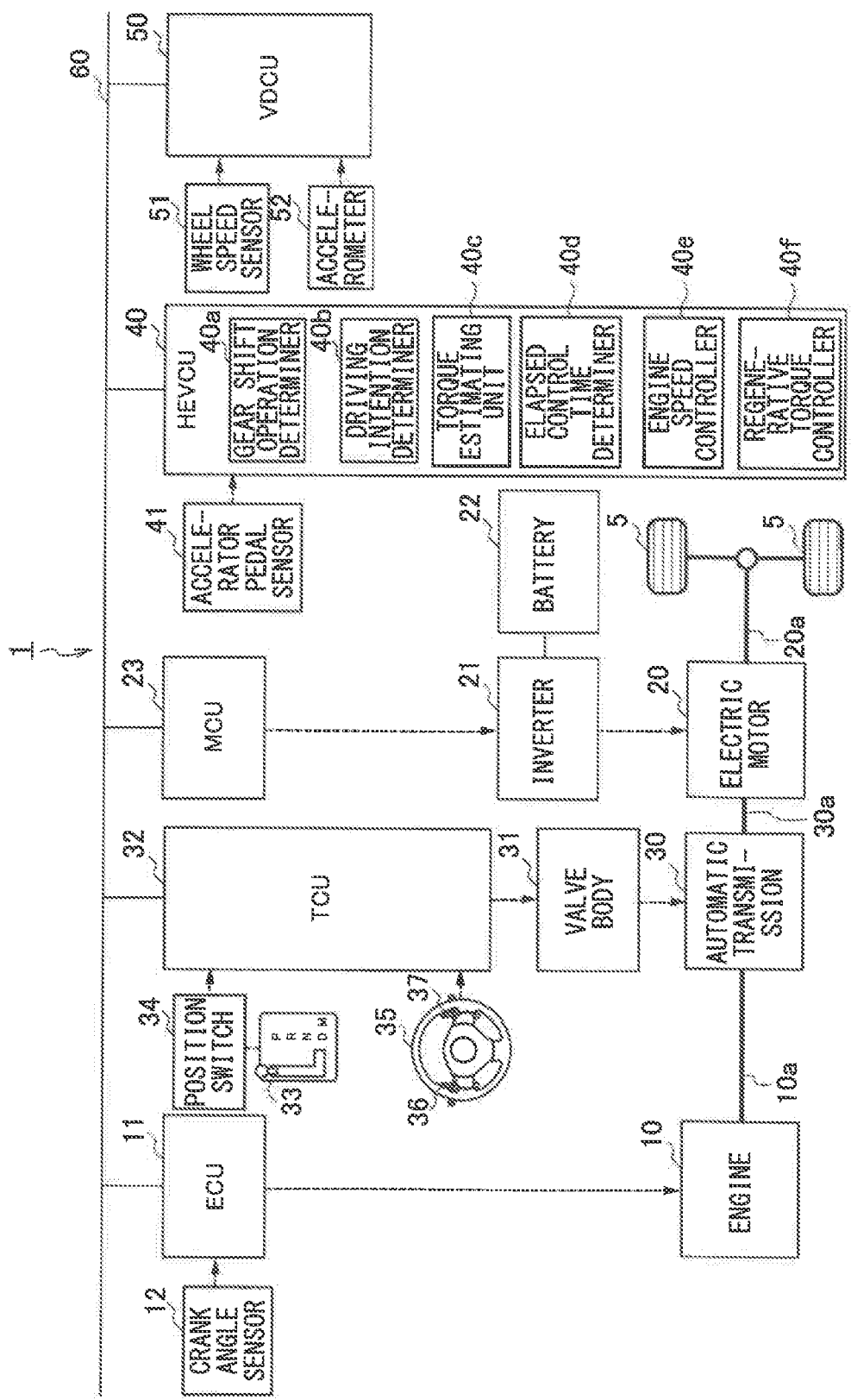
FIG. 1 is a block diagram illustrating am example of a configuration of a control apparatus for hybrid electric vehicle according to one implementation of the technology.

A detailed description is given below of some implementations of the technology with reference to the accompanying drawings. It is to be noted that the same or equivalent parts are denoted by the same numeral in the drawings. Further, the same or equivalent components are denoted by the same numeral in the drawings and a duplicative description thereof will be omitted. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale.

Regarding an automatic transmission, it takes time for shifting of the automatic transmission to be actually completed from time at which a shift control is started. For example, a step automatic transmission (AT) includes a plurality of planetary gear sets. Each of the planetary gear sets includes a plurality of gears. The gears in each of the planetary gear sets are assigned to a rotatable gear and a non-rotatable gear. Changing of the assignment of the gears is performed through a hydraulic pressure control performed on an engaging member such as a clutch or a brake. In the case of the step automatic transmission, it takes time to perform such changing of the assignment of the gears. The step automatic transmission may be temporarily placed into a neutral state in the course of the changing of the assignment of the gears. The neutral state of the automatic transmission may refer to a state in which power is prevented from being transmitted.

As described above, it takes time for shifting of an automatic transmission to be performed. Therefore, an automatic transmission having a manual shift mode involves time lag between time at which a shift operation is performed by a driver and time at which shifting of the automatic transmission into a stage selected through the shift operation is actually completed. Torque that is to be generated in the stage selected through the shift operation is prevented from being transmitted to a drive wheel during a time period between the time at which the shift operation is performed by the driver and the time at which the shifting of the automatic transmission is actually completed. For example, in a case where the driver performs a downshift operation, deceleration torque to be generated through engine braking, i.e., braking by means of an engine, in a lower stage selected through the downshift operation is prevented from being transmitted to the drive wheel during the time period described above. Accordingly, the vehicle may fail to generate a deceleration rate in accordance with the deceleration torque to be generated in the selected lower stage during the time period described above. As described above, the automatic transmission having the manual shift mode possibly involves a decrease in responsiveness to a shift operation performed by a driver.

It is desirable to provide a control apparatus for hybrid electric vehicle that improves responsiveness to a shift operation performed by a driver, in which the hybrid electric vehicle includes an automatic transmission having a manual shift mode.

[First Implementation]

A first implementation of the technology is directed to one application example of a control apparatus for hybrid electric vehicle provided with a step automatic transmission (a step AT). The foregoing control apparatus will be hereinafter referred to as a "control apparatus 1". A description is given of the control apparatus 1 according to the first implementation with reference to FIG. 1. FIG. 1 illustrates a configuration of the control apparatus 1 according to the first implementation.

The control apparatus 1 may be mounted on a hybrid electric vehicle. The hybrid electric vehicle may include an engine 10 and an electric motor 20 as drive sources. Further, the hybrid electric vehicle may include an automatic transmission 30 as a transmission.

The engine 10 may have any form. Non-limiting examples of the engine 10 may include a horizontal-opposed four cylinder gasoline engine. The engine 10 may have an output shaft 10a, i.e., a crankshaft, that is coupled to the automatic transmission 30. The engine 10 may be controlled by an ECU (Engine Control Unit) 11 which will be described later.

The electric motor 20 may serve as both a motor and a generator. Non-limiting examples of the electric motor 20 may include a three-phase alternating-current motor generator. The electric motor 20 may be disposed on a power transmission path between the automatic transmission 30 and drive wheels 5. The electric motor 20 may have an output shaft 20a that is coupled to the drive wheels 5, for example, with a member such as a propeller shaft, a differential gear, or a drive shaft in between. Accordingly, motor torque generated by the electric motor 20 such as drive torque or regenerative torque may be transmitted to the drive wheels 5 without being transmitted through the automatic transmission 30. The electric motor 20 may be controlled by an inverter 21.

The inverter 21 may convert direct-current electric power of a battery 22 into alternating-current electric power, and supply the thus-converted alternating-current electric power to the electric motor 20. The inverter 21 may also convert alternating-current electric power generated by the electric motor 20 through regeneration upon deceleration of the vehicle into direct-current electric power. The direct-current electric power thus converted may be stored in the battery 22. The inverter 21 may be controlled by an MCU (Motor Control Unit) 23 which will be described later. The battery 22 may be higher in voltage than an unillustrated auxiliary battery. The battery 22 may be, for example but not limited to, a lithium-ion battery.

The automatic transmission 30 may be a transmission that automatically performs shifting of a transmission's input/output speed ratio (speed ratio), i.e., a stage, in a stepwise manner. The automatic transmission 30 may have an output shaft 30a that is coupled to the electric motor 20. The automatic transmission 30 may include, for example, a torque converter. The automatic transmission 30 may also include, for example, a plurality of planetary gear sets and an engaging member. The engaging member may include, for example, a plurality of clutches and a plurality of brakes. The planetary gear sets may each include three members, i.e., a sun gear, a ring gear, and a carrier that supports pinion gears. The automatic transmission 30 may perform shifting by means of the engaging member. Upon the shifting of the automatic transmission 30, the automatic transmission 30 may assign the three members included in each planetary gear set, i.e., the sun gear, the ring gear, and the carrier, to any of an input component, a stationary component, and an output component. The input component may input power. The stationary component may be fixed. The output component may output power. The assignment of the sun gear, the ring gear, and the carrier in the automatic transmission 30 may be changed by means of the engaging member. The shifting of the automatic transmission may be thus performed. A hydraulic pressure control may be performed on the automatic transmission 30 by means of a valve body 31.

The valve body 31 may supply a hydraulic pressure to a member such as the torque converter of the automatic transmission 30 or the engaging members including the clutches and the brakes of the automatic transmission 30. The valve body 31 may be provided with a control valve mechanism built in the valve body 31. For example, the control value mechanism may open or close an oil passage formed in the valve body 31 to thereby adjust a pressure of oil discharged from an unillustrated oil pump. The opening or closing of the oil passage may be performed by means of a spool valve and a solenoid valve that moves the spool valve. The control valve mechanism may thus generate each hydraulic pressure suitable for each engaging member. The valve body 31 may be controlled by a TCU (Transmission Control Unit) 32 which will be described later.

The automatic transmission 30 may have, as its shift mode, an automatic shift mode, a manual shift mode, and a temporary manual shift mode which will be hereinafter abbreviated as a "temporary manual mode", for example. The automatic shift mode may automatically perform downshift or upshift of a stage in accordance with a traveling state of a vehicle. The manual shift mode may perform downshift or upshift of the stage in accordance with a shift operation performed by a driver of the vehicle. The temporary manual mode may perform downshift or upshift of the stage temporarily in accordance with the shift operation performed by the driver until a discontinuation condition is satisfied, when the shift operation is performed by the driver during the automatic shift mode. Non-limiting examples of the discontinuation condition may include an operation performed on a shifter, or an operation performed on an accelerator pedal to keep steady traveling, e.g., traveling at a constant speed, for a predetermined time period.

The vehicle may be provided with a shifter 33, i.e., a stage selector, in a floor, e.g., at a center console of the vehicle. By means of the shifter 33, selective switching may be performed between, for example, a drive position (a D-position), a manual position (an M-position), a park position (a P-position), a reverse position (an R-position), and a neutral position (an N-position). When the drive position is selected by means of the shifter 33, the shift mode of the vehicle may be switched to the automatic shift mode. When the manual position is selected by means of the shifter 33, the shift mode of the vehicle may be switched to the manual shift mode. The shifter 33 may be provided with a position switch 34. The position switch 34 may be so coupled to the shifter 33 that the position switch 34 operates in association with the shifter 33. The position switch 34 may detect the position selected by means of the shifter 33.

A steering wheel 35 may be provided with a minus (−) paddle switch 36 and a plus (+) paddle switch 37 on the back side of the steering wheel 35. When any of the minus paddle switch 36 and the plus paddle switch 37 is operated during the automatic shift mode, the shift mode may be switched to the temporary manual mode. The minus paddle switch 36 may be directed to downshift of the stage during any of the manual shift mode and the temporary manual mode. The plus paddle switch 37 may be directed to upshift of the stage during any of the manual shift mode and the temporary manual mode.

The TCU 32 may control the automatic transmission 30 by controlling the valve body 31. The TCU 32 may include devices such as a microprocessor that performs calculation, a ROM (Read-Only Memory) storing information such as a program that causes the microprocessor to execute each process, a RAM (Random Access Memory) that stores various pieces of data such as a result of the calculation, a backup RAM that holds stored contents thereof by means of twelve-volt battery, and an input-output I/F. The TCU 32 may be coupled to various switches such as the position switch 34, the minus paddle switch 36, or the plus paddle switch 37, to thereby acquire information necessary for the control performed by the TCU 32.

The TCU 32 may switch the shift mode to the automatic shift mode when the drive position is detected by the position switch 34 as being selected. In the automatic shift mode, the TCU 32 may control the valve body 31 to thereby automatically perform, on the basis of a shifting map, shifting of the automatic transmission 30 in accordance with the driving state of the vehicle, for example. In one example, the TCU 32 may so set a state of each of the engaging members such as the clutches or the brakes that any stage is achieved in accordance with the driving state. The setting of the state of each of the engaging members may include, for example, an engaging state or a disengaging state. The TCU 32 may so control each solenoid valve of the valve body 31 that each of the engaging members such as the clutches or the brakes is placed into the state thus set. The TCU 32 may thereby cause the shifting of the automatic transmission 30 to be performed. The shifting map may be stored, for example, in the ROM of the TCU 32.

The TCU 32 may switch the shift mode to the manual shift mode when the manual position is detected by the position switch 34 as being selected. Alternatively, the TCU 32 may switch the shift mode to the temporary manual mode when any of the minus paddle switch 36 and the plus paddle switch 37 is operated during the automatic shift mode. For example, when an operation corresponding to the discontinuation condition of the temporary manual mode described above is performed, the TCU 32 may switch the shift mode to the automatic shift mode. In any of the manual shift mode and the temporary manual mode, the TCU 32 may so control the valve body 31 that downshift into an adjacent lower stage is performed when the minus paddle switch 36 is operated. When the plus paddle switch 37 is operated, the TCU 32 may so control the valve body 31 that upshift into an adjacent higher stage is performed.

As described above, when the shift operation is performed by the driver by means of any of the minus paddle switch 36 and the plus paddle switch 37, the hydraulic pressures of the engaging member of the automatic transmission 30 such as the clutches or the brakes may be controlled by the TCU 32 and the valve body 31. Such a control of the hydraulic pressures makes a change in combination of a rotatable gear and a non-rotatable gear (a stationary gear) in each of the planetary gear sets of the automatic transmission 30.

Through such a change in combination of the rotatable gear and the non-rotatable gear, shifting of the automatic transmission 30 into a lower stage may be performed when the minus paddle switch 36 is operated, and shifting of the automatic transmission 30 into a higher stage may be performed when the plus paddle switch 37 is operated. It may take time until the shifting of the automatic transmission 30 is started through the hydraulic pressure control in the above-described manner and downshift of the automatic transmission 30 into the lower stage or upshift of the automatic transmission 30 into the higher stage is completed.

The automatic transmission 30 may be temporarily placed into a neutral state in a course of the shifting, i.e., during the transition of the shifting. When the automatic transmission 30 is in the neutral state, the engine 10 may be disconnected with the drive wheels 5. This may prevent power from being transmitted between the engine 10 and the drive wheels 5. Therefore, for example, in a case where deceleration of the vehicle is performed, the power from the drive wheels 5 may not be transmitted to the engine 10 while the automatic transmission 30 is in the neutral state. This may prevent engine braking from being performed, which may in turn prevent generation of deceleration torque through the braking by means of the engine 10. Therefore, the deceleration torque may become insufficient during the shifting performed by the automatic transmission 30, and may be therefore smaller in magnitude than the deceleration torque to be generated after the shifting is completed.

To address this, when the shift operation is performed by the driver during deceleration of the vehicle, the control apparatus 1 may so control regenerative torque generated by the electric motor 20 that deceleration torque to be generated in the stage selected through the shift operation is generated, during the shifting of the automatic transmission 30. Each process to be performed by the control apparatus 1 may be executed by any of the ECU 11, the MCU 23, and an HEVCU (Hybrid Electric Vehicle Control Unit) 40. The units such as the ECU 11, the MCU 23, the HEVCU 40, the TCU 32, or a VDCU (Vehicle Dynamics Control Unit) 50 may be able to perform mutual communication with each other to thereby supply or receive, for example, various pieces of information or various signals. Such mutual communication may be achieved, for example, through a CAN (Controller Area Network) 60.

The VDCU 50 may be a control unit that suppresses unstable behavior of the vehicle such as a skid. The VDCU 50 may be coupled to various sensors such as a wheel speed sensor 51 provided for each wheel or an accelerometer 52, to thereby obtain information necessary for the control performed by the VDCU 50. The wheel speed sensor 51 may detect a rotation state of the wheel. A wheel speed may be calculated on the basis of information regarding the rotation state of the wheel detected by the wheel speed sensor 51. The accelerometer 52 may detect an acceleration rate, for example, in a front-rear direction, a right-left direction, or any other direction of the vehicle. A slope of a road surface may be calculated and estimated on the basis of information such as the acceleration rate in the front-rear direction detected by the accelerometer 52.

The ECU 11 may control the engine 10. The ECU 11 may include devices such as a microprocessor, a ROM, a RAM, a backup RAM, or an input-output I/F, as with the TCU 32. The ECU 11 may be coupled to various sensors such as a crank angle sensor 12 to thereby obtain information necessary for the control performed by the ECU 11. The crank angle sensor 12 may detect a rotation angle of the output shaft 10a, i.e., the crankshaft, of the engine 10. The ECU 11 may calculate an engine speed on the basis of the rotation angle of the output shaft 10a. In one implementation, the ECU 11 may serve as an "engine controller".

For example, when information regarding requested engine drive force is received from the HEVCU 40, the ECU 11 may adjust a position of an throttle valve of an electronic control type on the basis of the received information regarding the requested engine drive force. For example, the ECU 11 may control an intake air amount on the basis of the received information regarding the requested engine drive force. In one example, when information regarding a target engine speed is received from the HEVCU 40, the ECU 11 may so adjust the position of the electronic-control-type throttle valve as to cause the engine speed to be the target engine speed, as a process of the control apparatus 1.

The MCU 23 may be a control unit that controls drive of the electric motor 20 by controlling the inverter 21. The MCU 23 may include devices such as a microprocessor, a ROM, a RAM, a backup RAM, or an input-output I/F, as with the TCU 32. In one implementation, the MCU 23 may serve as an "electric motor controller".

For example, when information regarding instructed motor torque is received from the HEVCU 40, the MCU 23 may control the inverter 21 on the basis of the received information regarding the instructed motor torque. For example, the MCU 23 may so control the inverter 21 as to cause the regenerative torque to be the instructed motor torque, as a process of the control apparatus 1, when the information regarding the instructed motor torque is received from the HEVCU 40. In one example, the information regarding the instructed motor torque may be an instructed value of the regenerative torque.

The HEVCU 40 may perform a general control of the hybrid electric vehicle. The HEVCU 40 may include devices such as a microprocessor, a ROM, a RAM, a backup RAM, or an input-output I/F, as with the TCU 32. The HEVCU 40 may be coupled to various sensors such as an accelerator pedal sensor 41 to thereby obtain information necessary for the control performed by the HEVCU 40. The accelerator pedal sensor 41 may detect a position of an accelerator pedal which is hereinafter referred to as an "accelerator pedal position". The HEVCU 40 may obtain various pieces of information through the CAN 60. For example, information regarding an engine speed may be obtained from the ECU 11, information regarding the position, selected by means of the shifter 33, which is detected by the position switch 34 may be obtained from the TCU 32, information regarding an operation performed on each of the minus paddle switch 36 and the plus paddle switch 37 may be obtained from the TCU 32, and information regarding a vehicle speed or information regarding a slope of a road surface may be obtained from the VDCU 50, as the various pieces of information obtained through the CAN 60.

For example, the HEVCU 40 may calculate the requested drive force on the basis of a factor such as the accelerator pedal position or the vehicle speed, and divide the requested drive force into requested engine drive force and requested motor drive force on the basis of a factor such as an SOC (State Of Charge) of the battery 22. Further, the HEVCU 40 may supply information regarding the requested engine drive force to the ECU 11 through the CAN 60. Further, the HEVCU 40 may calculate requested motor torque from the requested motor drive force and a motor speed, and supply the information regarding the requested motor torque calculated, as information regarding instructed motor torque, to the MCU 23 through the CAN 60. In one example, the information regarding the instructed motor torque may be any of an instructed value of drive torque and an instructed value of regenerative torque.

In one implementation, the HEVCU 40 may include a shift operation determiner 40a, a driving intention determiner 40b, a torque estimating unit 40c, an elapsed control time determiner 40d, an engine speed controller 40e, and a regenerative torque controller 40f, to thereby achieve each process of the control apparatus 1. The HEVCU 40 may cause a function of each of the shift operation determiner 40a, the driving intention determiner 40b, the torque estimating unit 40c, the elapsed control time determiner 40d, the engine speed controller 40e, and the regenerative torque controller 40f to be achieved, by causing the microprocessor to execute each program stored in a storage such as the ROM. In one implementation, the shift operation determiner 40a may serve as a "shift operation detector". In one implementation, the driving intention determiner 40b may serve as an "estimated driving action determiner". In one implementation, the torque estimating unit 40c may serve as a "torque estimating unit".

The shift operation determiner 40a may determine, on the basis of the information regarding the operation performed on the minus paddle switch 36 and the information regarding the operation performed on the plus paddle switch 37, whether any of the minus paddle switch 36 and the plus paddle switch 37 is operated. When the minus paddle switch 36 is determined as being operated, the shift operation determiner 40a may determine that a downshift operation is performed by the driver. When the plus paddle switch 37 is determined as being operated, the shift operation determiner 40a may determine that an upshift operation is performed by the driver.

On a condition that the manual position is selected by means of the shifter 33 and the downshift operation is determined by the shift operation determiner 40a as being performed, the driving intention determiner 40b may determine, on the basis of the accelerator pedal position detected by the accelerator pedal sensor 41, whether the driver's intention is directed to deceleration or acceleration. For example, when the accelerator pedal position is 0[%], i.e., when the accelerator pedal is not pressed down, the driving intention determiner 40b may determine that the driver's intention is directed to deceleration. When the accelerator pedal position is not 0[%], i.e., when the accelerator pedal is pressed down, the driving intention determiner 40b may determine that the driver's intention is directed to acceleration.

It is to be noted that, on a condition that the drive position is selected by means of the shifter 33 and the downshift operation is determined by the shift operation determiner 40a as being performed, the driver's intention may be regarded as being directed to deceleration, and a determination as to whether the driver's intention is directed to deceleration or acceleration may not be performed. In a case where the drive position is selected by means of the shifter 33, it is possible to perform downshift by pressing down the accelerator pedal without necessity of performing the downshift operation, when the driver having the intention directed to acceleration wants to perform downshift. For such a reason, the downshift operation performed when the drive position is selected may be regarded as being directed to deceleration.

When any of the downshift operation and the upshift operation is determined by the shift operation determiner 40a as being performed, the torque estimating unit 40c may estimate torque that is to be transmitted to the drive wheels 5 after the shifting of the automatic transmission 30 is completed in accordance with any of the downshift operation and the upshift operation that is determined as being performed. The torque that is to be transmitted to the drive wheels 5 after the shifting of the automatic transmission 30 is completed may be, in other words, torque that is to be transmitted through a power transmission path between the electric motor 20 and the drive wheels 5. One example of a method of estimating the foregoing torque may use a map. For example, searching through the map may be performed on the basis of the stage at the time when the shift operation is performed, the vehicle speed at the time when the shift operation is performed, and the slope of the road surface at the time when the shift operation is performed, to thereby estimate, i.e., calculate, the torque to be transmitted to the drive wheels 5 after the shifting of the automatic transmission 30 is completed. For example, the map may be provided for each stage at the time when the shift operation is performed. In the map, the vehicle speed and the slope of the road surface may be stored in association with the torque to be transmitted to the drive wheels 5 after the shifting of the automatic transmission 30 into the stage selected through the shift operation is completed. The map may be stored, for example, in the ROM of the HEVCU 40. An alternative example of the method of estimating the foregoing torque may be a method that calculates deceleration torque of the vehicle from the deceleration rate of the vehicle at the time when the shift operation is performed, and multiples the calculated deceleration torque by a ratio of the speed ratio of the stage before the shifting relative to the speed ratio of the stage after the shifting. The deceleration torque of the vehicle may be deceleration torque before the shifting is performed. The torque to be transmitted to the drive wheels 5 after the shifting is completed may be thus estimated.

The elapsed control time determiner 40d may determine an elapsed time period that is a time period having elapsed from the time at which a regenerative torque control is started. The regenerative torque control may be performed when the shift operation is performed by the driver during deceleration of the vehicle. For example, the elapsed control time determiner 40d may measure an elapsed time period from one of: the time at which the downshift operation is determined by the shift operation determiner 40a as being performed and the driver's intention is determined by the driving intention determiner 40b as being directed to deceleration; and the time at which the upshift operation is determined by the shift operation determiner 40a as being performed. Further, the elapsed control time determiner 40d may determine whether the measured elapsed time period reaches a predetermined time period. In one example, the predetermined time period may be set on the basis of a time period from the time at which the hydraulic pressure control directed to the shifting of the automatic transmission 30 is started to the time at which the engagement is started by the engaging member of the automatic transmission 30.

On a condition that the downshift operation is determined by the shift operation determiner 40a as being performed and the driver's intention is determined by the driving intention determiner 40b as being directed to deceleration, the engine speed controller 40e may set a target engine speed and supply information regarding the set target engine speed to the ECU 11. The engine speed controller 40e may set the target engine speed until the shifting of the automatic transmission 30 into a lower stage is completed, e.g., during the shift control performed on the automatic transmission 30. The target engine speed may be set on the basis of an engine speed to be achieved after the shifting of the automatic transmission 30 into the lower stage is completed. The engine speed after the shifting of the automatic transmission 30 into the lower stage is completed may be higher than that before the shifting of the automatic transmission 30 into the lower stage. In one example, the target engine speed may be set to the engine speed to be achieved after the shifting of the automatic transmission 30 into the lower stage is achieved as it is. In an alternative example, the target engine speed may be set to an engine speed that is higher than the engine speed to be achieved after the shifting of the automatic transmission 30 into to the lower stage is completed by a predetermined speed.

On a condition that the upshift operation is determined by the shift operation determiner 40*a* as being performed, the engine speed controller 40*e* may set the target engine speed, and supply information regarding the set target engine speed to the ECU 11. The engine speed controller 40*e* may set the target engine speed until the shifting of the automatic transmission 30 into a higher stage is completed. The target engine speed may be set on the basis of an engine speed to be achieved after the shifting of the automatic transmission 30 into the higher stage is completed. The engine speed to be achieved after the shifting of the automatic transmission 30 into the higher stage is completed may be lower than that before the shifting of the automatic transmission 30 into the higher stage. In one example, the target engine speed may be set to the engine speed to be achieved after the shifting of the automatic transmission 30 into the higher stage is completed as it is.

One example of a method of obtaining or estimating the engine speed to be achieved after the shifting of the automatic transmission 30 into the stage selected through the shift operation is completed may use a map. For example, searching through the map may be performed on the basis of the stage and the engine speed at the time when the shift operation is performed, to thereby obtain the engine speed to be achieved after the shifting of the automatic transmission 30 is completed. For example, the map may be provided for each stage at the time when the shift operation is performed. In the map, the engine speed at the time when the shift operation is performed may be stored in association with an engine speed to be achieved after the shifting of the automatic transmission 30 into the stage selected through the shift operation is completed. The map may be stored, for example, in the ROM of the HEVCU 40. An alternative example of the method of obtaining the engine speed to be achieved after the shifting of the automatic transmission 30 into the stage selected through the shift operation is completed may be a method that multiples the engine speed at the time when the shift operation is performed, i.e., the engine speed before the shifting is performed, by a ratio of the speed ratio of the stage before the shifting is performed relative to the speed ratio of the stage after the shifting is completed. The engine speed after the shifting is completed may be thus obtained.

On a condition that the downshift operation is determined by the shift operation determiner 40*a* as being performed and the driver's intention is determined by the driving intention determiner 40*b* as being directed to deceleration, the regenerative torque controller 40*f* may set instructed motor torque, and supply information regarding the set instructed motor torque to the MCU 23, until the predetermined time period is determined by the elapsed control time determiner 40*d* as having elapsed. The instructed motor torque may be an instructed value of the regenerative torque. The instructed motor torque may be set on the basis of the deceleration torque estimated by the torque estimating unit 40*c*. The automatic transmission 30 may be placed into a neutral state during the shifting of the automatic transmission 30. Therefore, the deceleration torque derived from the engine braking may not be generated during the shifting of the automatic transmission 30. Therefore, the lack or insufficiency of the deceleration torque generated through the engine braking may be compensated by increasing the regenerative torque generated by the electric motor 20 on the basis of the foregoing instructed motor torque. For example, when the downshift operation is performed, an absolute value of the deceleration torque to be generated after the shifting of the automatic transmission 30 into the lower stage is completed may be greater than an absolute value of the deceleration torque before the shifting of the automatic transmission 30 into the lower stage. Therefore, regenerative torque equivalent to the great deceleration torque may be generated on the basis of the instructed motor torque. The foregoing great deceleration torque may include the torque to be generated through the engine braking after the shifting of the automatic transmission 30 into the lower stage is completed.

The instructed motor torque may be set to, for example, regenerative torque that generates the deceleration torque estimated by the torque estimating unit 40*c*. In one example, the engine speed may be controlled to be increased by the engine speed controller 40*e*. Therefore, in a case where an amount of an increase in drive torque resulting from the increase in engine speed is transmitted to the drive wheels 5, an amount of the regenerative torque that absorbs the amount of the increase in drive torque may be added to the instructed motor torque. In one example, the instructed motor torque may be kept at a constant value until the predetermined time period is determined by the elapsed control time determiner 40*d* as having elapsed from the time at which the control is started. In an alternative example, the instructed motor torque may be varied in accordance with a factor such as the vehicle speed or the slope of the road surface.

In some cases, by increasing the regenerative torque that absorb the amount of driving torque increased by increasing the engine speed, the electric motor 20 can generate electricity efficiently in a high regeneration efficiency region. In such a case, the target engine speed may be favorably increased by a predetermined speed and the instructed motor torque (the regenerative torque) may be so increased that the regenerative torque falls within the high regeneration efficiency region of the electric motor 20. Further, in the last part of the control, i.e., when the regenerative torque falls within a range of the regenerative torque corresponding to lower regeneration efficiency, the instructed motor torque may be decreased gradually, and the target engine speed may be decreased gradually.

On a condition that the upshift operation is determined by the shift operation determiner 40*a* as being performed, the regenerative torque controller 40*f* may set the instructed motor torque, and supply information regarding the set instructed motor torque to the MCU 23, until the predetermined time period is determined by the elapsed control time determiner 40*d* as having elapsed. The instructed motor torque may be set on the basis of the torque estimated by the torque estimating unit 40*c*. The instructed motor torque may be, for example, the instructed value of the regenerative torque. In one example, the instructed motor torque may be set to the regenerative torque that is directed to generation of the deceleration torque estimated by the torque estimating unit 40*c*. The lack of the deceleration torque generated through the engine braking may be compensated by increasing the regenerative torque of the electric motor 20 on the basis of the foregoing instructed motor torque, also in the case of the upshift operation, as with the case of the downshift operation. For example, when the upshift operation is performed, an absolute value of the deceleration torque after the shifting of the automatic transmission 30 into the higher stage is completed may be smaller than an absolute value of the deceleration torque before the shifting of the automatic transmission 30 into the higher stage is performed. Therefore, the regenerative torque equivalent to the small deceleration torque may be generated on the basis of the instructed motor torque. The foregoing small deceleration torque may include the torque to be generated through the engine braking after the shifting of the automatic transmission 30 into the higher stage is completed.

After the predetermined time period is determined by the elapsed control time determiner 40d as having elapsed, the regenerative torque controller 40f may gradually decrease the value of the regenerative torque from its instructed value based on the torque estimated by the torque estimating unit 40c, and supply, to the MCU 23, information regarding the instructed motor torque that indicates each gradually-decreased regenerative torque. In one example, upon the foregoing control that decreases the value of the regenerative torque, the value of the regenerative torque may be decreased to the value of the requested motor torque calculated through the regular control described above. One example method of decreasing of the value of the regenerative torque may be a method that sets, in advance, an allowable variation value (for decreasing) of the regenerative torque that is allowable in a calculation period of the HEVCU 40, and subtracts, in each calculation period, a value not greater than the allowable variation value from the previous value of the regeneration torque, to thereby decrease the value of the regeneration torque, i.e., the instructed motor torque. On the basis of the instructed torque thus decreased gradually, it may be possible to decrease the regenerative torque generated by the electric motor 20 in correspondence with the engine braking in the last part of the regenerative torque control. The engine braking may be increased, in magnitude, in accordance with the engaging state of the engaging member of the automatic transmission 30.

Similarly, in a case of increasing the regenerative torque at the time when the regenerative torque control is started, an allowable variation value (for increasing) of the regenerative torque that is allowable in a calculation period of the HEVCU 40 may be also set in advance, and the value of the regenerative torque may be increased by a value not greater than the set allowable variation value. It is to be noted that, however, the allowable variation value for increasing the regenerative torque may be set to a value greater than the allowable variation value (for decreasing) by which the regenerative torque is decreased gradually in the last part of the regenerative torque control.

Figure 2:
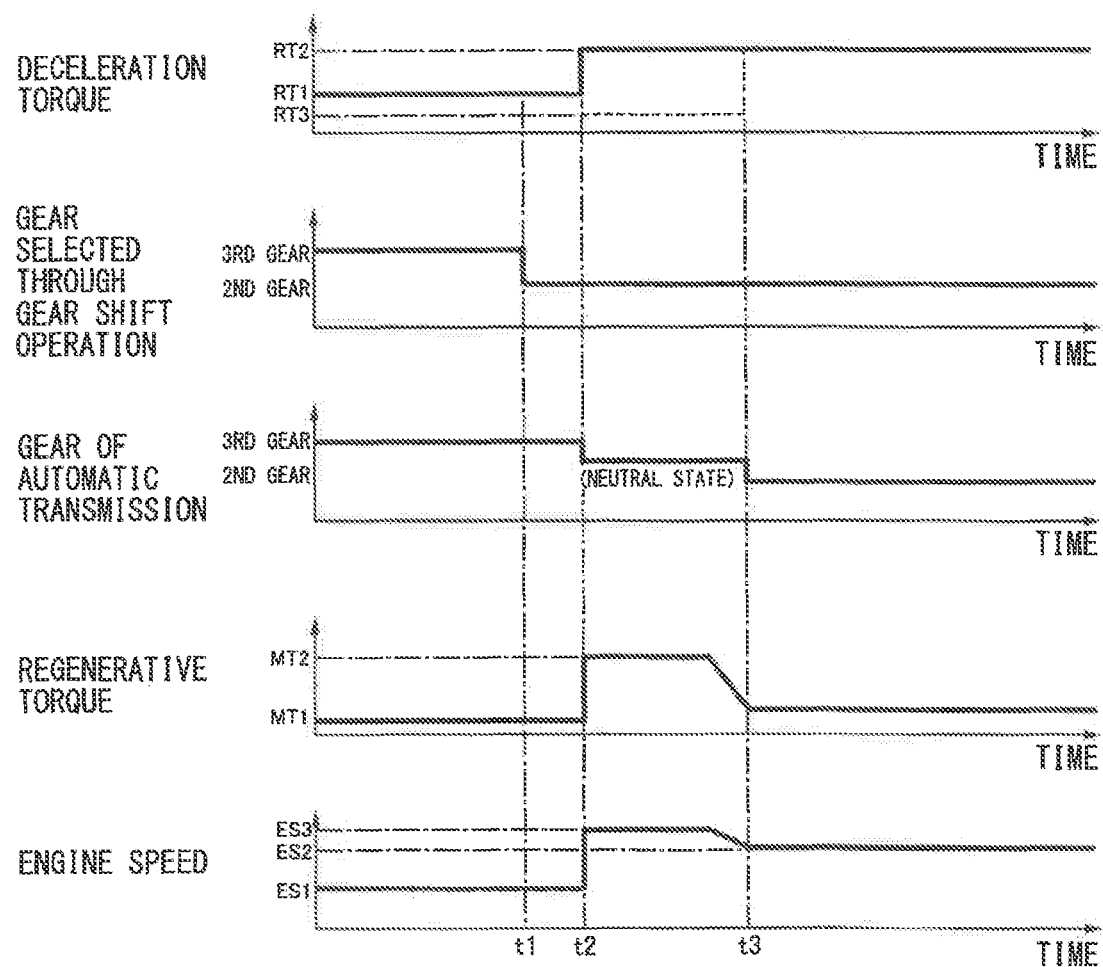
FIG. 2 is a diagram illustrating an example of a timing chart regarding a control to be performed by the control apparatus for hybrid electric vehicle according to one implementation of the technology, and illustrates an example case of performing a downshift operation from a third stage into a second stage.

A description is given next of one example of timing of variation in each of the regenerative torque, the engine speed, and the deceleration torque transmitted to the drive wheels 5, with reference to FIG. 2. The foregoing variation in each of the regenerative torque, the engine speed, and the deceleration torque transmitted to the drive wheels 5 may be caused by a control performed by the control apparatus 1 on a condition that the downshift operation is performed by the driver having the intention directed to deceleration, during the deceleration of the vehicle. FIG. 2 illustrates one example of a timing chart regarding the control performed by the control apparatus 1.

A horizontal axis of the timing chart illustrated in FIG. 2 indicates time. FIG. 2 illustrates, in order from the top, a graph indicating the deceleration torque transmitted to the drive wheels 5, a graph indicating the stage selected through the shift operation performed by the driver, a graph indicating the stage of the automatic transmission 30, a graph indicating the regenerative torque generated by the electric motor 20, and a graph indicating the engine speed of the engine 10. It is to be noted that, although each of the deceleration torque and the regenerative torque is minus torque that is directed to deceleration of the vehicle, each of the deceleration torque and the regenerative torque in FIG. 2 is described in its absolute value for the purpose of easier understanding of an increase or a decrease in magnitude.

At time t1, a downshift operation from a third stage into a second stage may be performed by the driver by means of the minus paddle switch 36. In response to the downshift operation performed by the driver, the hydraulic pressure control directed to shifting of the automatic transmission 30 from the third stage into the second stage may be performed by the TCU 32 and the valve body 31. This hydraulic pressure control may cause the shifting of the automatic transmission 30 to be started at time t2. The shifting of the automatic transmission 30 may be completed, and as a result, the stage of the automatic transmission 30 may be set to the second stage, at time t3.

Further, in response to the downshift operation performed by the driver, a control that increases the regenerative torque may be performed by the MCU 23 and the inverter 21 in accordance with each command given by the HEVCU 40. Further, a control that increases the engine speed may be performed by the ECU 11 in accordance with each command given by the HEVCU 40, also in response to the downshift operation performed by the driver. As a result of the foregoing control performed by the MCU 23, the regenerative torque generated by the electric motor 20 may be increased at the time t2. For example, the regenerative torque generated by the electric motor 20 may be increased from MT1 to MT2 at the time t2. Further, as a result of the foregoing control performed by the ECU 11, the engine speed may be increased at the time t2. For example, the engine speed may be increased from ES1 to ES3 at the time t2. In the example illustrated in FIG. 2, the engine speed ES3 after the foregoing increase in engine speed may be higher than an engine speed ES2 by a predetermined speed (ES3-ES2). The engine speed ES2 may be an engine speed after the shifting of the automatic transmission 30 into the second stage is completed, and may be higher than the engine speed ES1 before the shifting of the automatic transmission 30 into the second stage is performed. The regenerative torque MT2 after the foregoing increase in regenerative torque may include additionally-provided torque that absorbs an amount of an increase in drive torque caused by the engine speed ES3 that is higher than the engine speed ES2 by the predetermined engine speed. The electric motor 20 that generates the foregoing great regenerative torque MT2 may perform electric power generation with higher regeneration efficiency.

The regenerative torque MT2 after the increase in regenerative torque may compensate the lack, of torque, caused by the neutral state of the automatic transmission 30. In other words, the deceleration torque transmitted to the drive wheels 5 may be increased at the time t2 in correspondence with the increase in engine braking resulting from the downshift. For example, the deceleration torque transmitted to the drive wheels 5 may be increased from RT1 to RT2 at the time t2. The deceleration torque RT2 after the foregoing increase in deceleration torque may be equivalent to the deceleration torque including the torque generated through the engine braking that is generated when the shifting of the automatic transmission 30 into the second stage is completed. This deceleration torque RT2 after the increase in deceleration torque may increase the deceleration rate of the vehicle.

As it approaches time t3 at which the shifting of the automatic transmission 30 into the second stage is completed, e.g., when the predetermined time period has elapsed from the time at which the control is started, the regenerative torque may be decreased gradually and the engine speed may be also decreased gradually. On this occasion, the deceleration torque generated through the engine braking may be increased gradually in accordance with the engaging state of the engaging member of the automatic transmission 30. Further, at the time t3, i.e., when the engaging in the automatic transmission 30 by the engaging member is completed and the shifting of the automatic transmission 30 into the second stage is thereby completed, the HEVCU 40 may return to the regular control. At the time t3, the regenerative torque based on the regular control, e.g., regenerative torque that is slightly greater than the regenerative torque MT1 at the time when the control is started may be achieved. Further, the engine speed ES2 that is in accordance with the second stage of the automatic transmission 30 and is greater than ES1 may be achieved at the time t3. Further, the deceleration torque generated through the engine braking may be increased at the time t3. The deceleration torque transmitted to the drive wheels 5 may be the deceleration torque RT2 including the increased deceleration torque generated through the engine braking, and may not be varied in magnitude from and after the time t2. It is to be noted that, in a case where the regenerative torque generated by the electric motor 20 is not increased, the deceleration torque may be decreased from RT1 to RT3 as illustrated by a dashed line at the time t2, may be kept at RT3 between the time t2 and the time t3, may be increased from RT3 to RT2 at the time t3, and may be kept at RT2 after the time t3.

Figure 3:
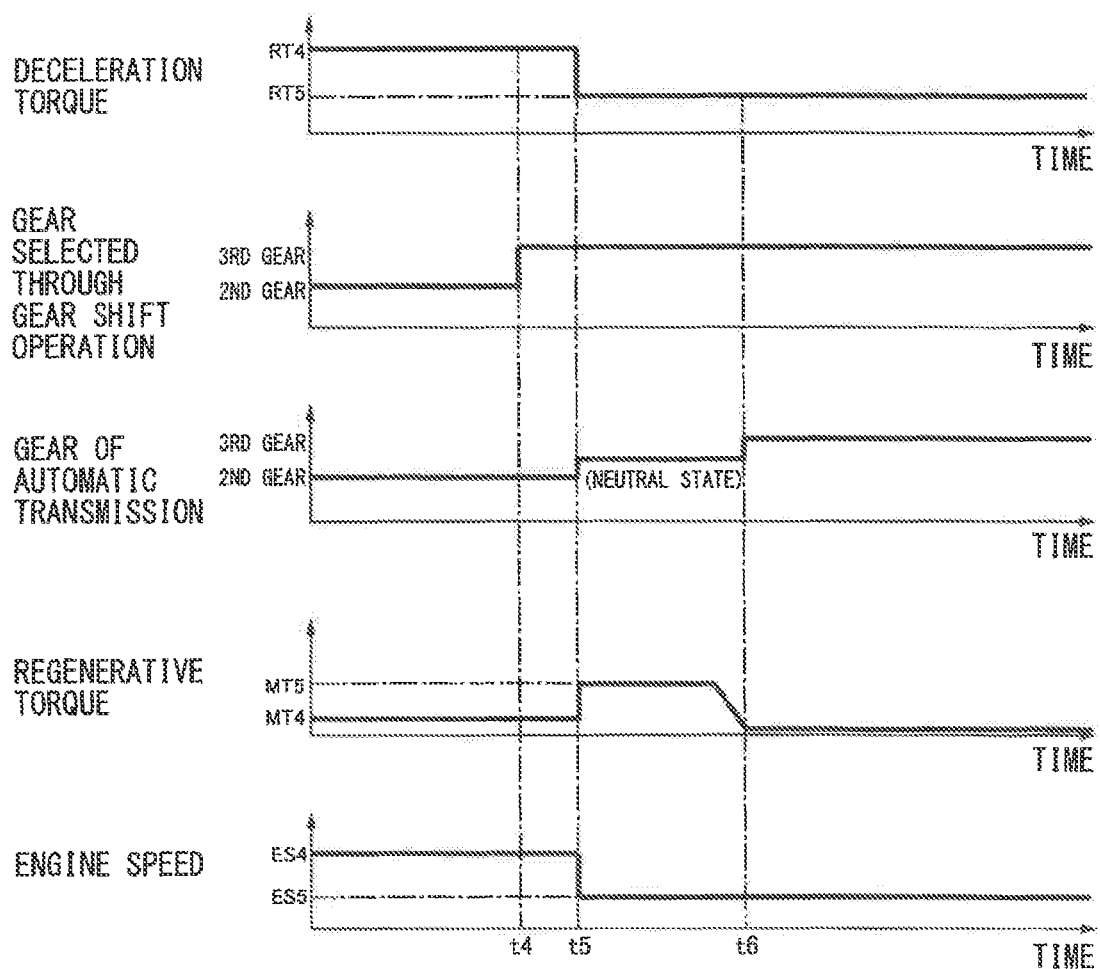
FIG. 3 is a diagram illustrating an example of a timing chart regarding a control to be performed by the control apparatus for hybrid electric vehicle according to one implementation of the technology, and illustrates an example case of performing an upshift operation from the second stage into the third stage.

A description is given next of one example of timing of variation in each of the regenerative torque, the engine speed, and the deceleration torque transmitted to the drive wheels 5, with reference to FIG. 3. The foregoing variation in each of the regenerative torque, the engine speed, and the deceleration torque transmitted to the drive wheels 5 may be caused by a control performed by the control apparatus 1 on a condition that the upshift operation is performed by the driver during the deceleration of the vehicle. FIG. 3 illustrates an example case where regenerative torque having any magnitude is generated at the time when the shift operation is performed by the driver. FIG. 3 illustrates one example of a timing chart regarding the control performed by the control apparatus 1. A horizontal axis of the timing chart illustrated in FIG. 3 indicates time. FIG. 3 illustrates, in order from the top, a graph indicating the deceleration torque transmitted to the drive wheels 5, a graph indicating the stage selected through the stage shift operation performed by the driver, a graph indicating the stage of the automatic transmission 30, a graph indicating the regenerative torque generated by the electric motor 20, and a graph indicating the engine speed of the engine 10, as with FIG. 2.

At time t4, an upshift operation from a second stage into a third stage may be performed by the driver by means of the plus paddle switch 37. In response to the upshift operation performed by the driver, the hydraulic pressure control directed to shifting of the automatic transmission 30 from the second stage into the third stage may be performed by the TCU 32 and the valve body 31. This hydraulic pressure control may cause the shifting of the automatic transmission 30 to be started at time t5. The shifting of the automatic transmission 30 may be completed, and as a result, the stage of the automatic transmission 30 may be set to the third stage, at time t6.

Further, in response to the upshift operation performed by the driver, a control that increases the regenerative torque may be performed by the MCU 23 and the inverter 21 in accordance with each command given by the HEVCU 40. Further, a control that decreases the engine speed may be performed by the ECU 11 in accordance with each command given by the HEVCU 40, also in response to the upshift operation performed by the driver. As a result of the foregoing control performed by the MCU 23, the regenerative torque generated by the electric motor 20 may be increased at the time t5. For example, the regenerative torque generated by the electric motor 20 may be increased from MT4 to MT5 at the time t5. Further, as a result of the foregoing control performed by the ECU 11, the engine speed may be decreased at the time t5. For example, the engine speed may be decreased from ES4 to ES5 at the time t5.

The regenerative torque MT5 after the increase in regenerative torque may compensate the lack, of torque, caused by the neutral state of the automatic transmission 30. In other words, the deceleration torque transmitted to the drive wheels 5 may be decreased at the time t5 in correspondence with the decrease in engine braking resulting from the upshift. For example, the deceleration torque transmitted to the drive wheels 5 may be decreased from RT4 to RT5 at the time t5. The deceleration torque RT5 after the foregoing decrease in deceleration torque may be equivalent to the deceleration torque including the torque generated through the engine braking that is to be generated when the shifting of the automatic transmission 30 into the third stage is completed. This deceleration torque RT5 after the decrease in deceleration torque may decrease the deceleration rate of the vehicle.

As it approaches time t6 at which the shifting of the automatic transmission 30 into the third stage is completed, i.e., when the predetermined time period has elapsed from the time at which the control is started, the regenerative torque may be decreased gradually. On this occasion, the deceleration torque generated through the engine braking may be increased gradually in accordance with the engaging state of the engaging member of the automatic transmission 30. Further, at the time t6, i.e., when the engaging in the automatic transmission 30 by the engaging member is completed and the shifting of the automatic transmission 30 into the third stage is thereby completed, the HEVCU 40 may return to the regular control. At the time t6, the regenerative torque based on the regular control, e.g., regenerative torque that is smaller than the regenerative torque MT4 at the time when the control is started may be achieved. Further, the deceleration torque generated through the engine braking may be decreased at the time t6. The deceleration torque transmitted to the drive wheels 5 may be the deceleration torque RT5 including the decreased deceleration torque generated through the engine braking, and may not be varied in magnitude from and after the time t5.

Figure 4:
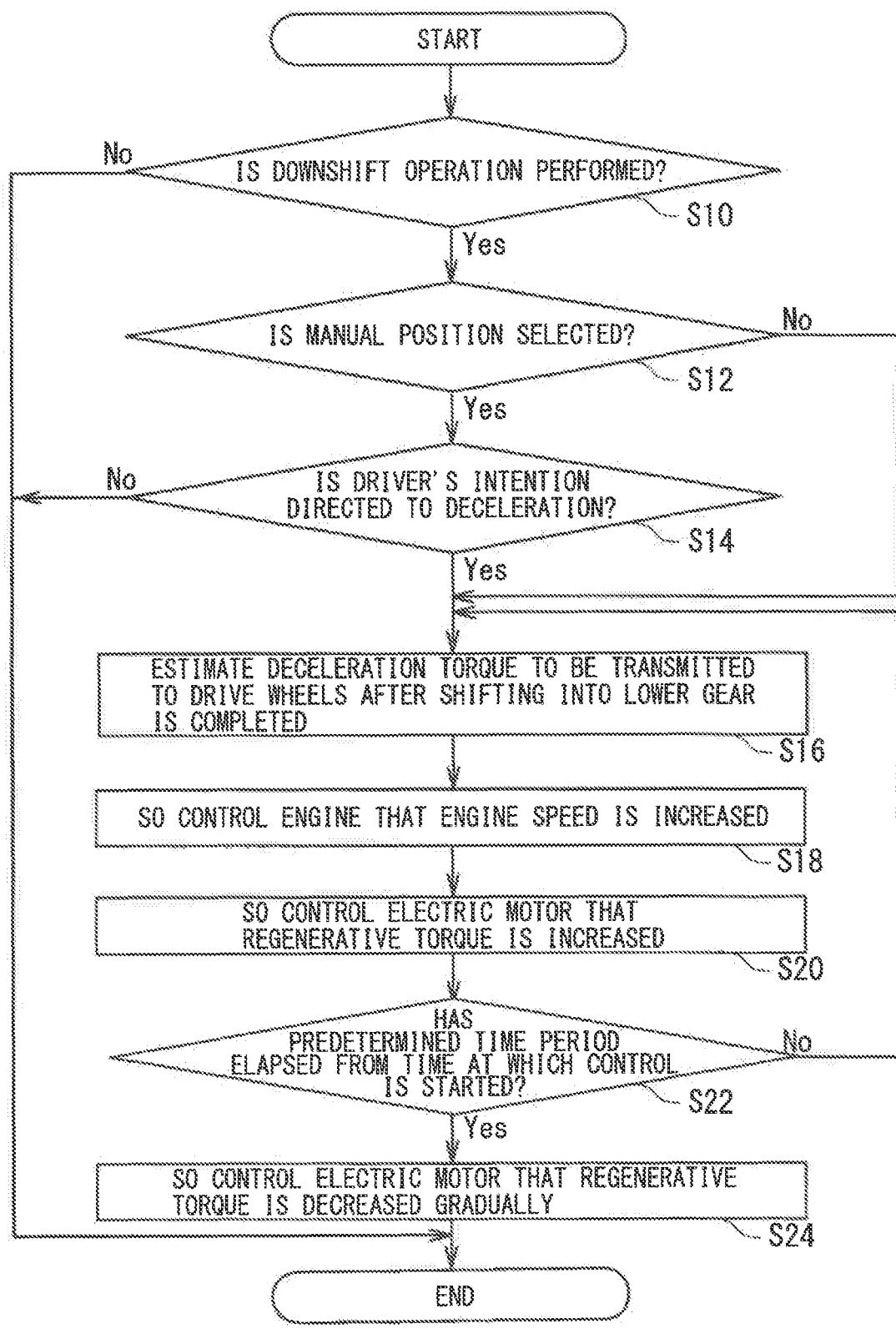
FIG. 4 is a flowchart illustrating an example of a flow of an operation to be performed by the control apparatus for hybrid electric vehicle according to one implementation of the technology in a case where the downshift operation is performed.

A description is given next of an operation of the control apparatus 1 with reference to the flowchart illustrated in FIG. 4 and also to the block diagram illustrated in FIG. 1. The description below refers to, as an example, an operation corresponding to the downshift operation performed by the driver. FIG. 4 is a flowchart illustrating a flow of an operation of the control apparatus 1 in a case where the downshift operation is performed. The control apparatus 1 may perform the following processes repeatedly at predetermined timing.

The HEVCU 40 may determine, on the basis of the information regarding an operation performed on the minus paddle switch 36, whether the downshift operation is performed (step S10). When the downshift operation is determined in step S10 as not being performed (step S10: No), the HEVCU 40 may once end the process.

When the downshift operation is determined in step S10 as being performed (step S10: Yes), the HEVCU 40 may determine, on the basis of the information regarding the selected position detected by the position switch 34, whether the manual position is selected (step S12). When the manual position is determined in step S12 as being selected (step S12: Yes), the HEVCU 40 may determine, on the basis of the accelerator pedal position detected by the accelerator pedal sensor 41, whether the driver's intention is directed to deceleration (step S14). When the driver's intension is determined in step S14 as not being directed to deceleration, i.e., when the driver's intension is determined in step S14 as being directed to acceleration (step S14: No), the HEVCU 40 may once end the process.

When the driver's intention is determined as being directed to deceleration in step S14 (step S14: Yes) or when the manual position is determined as not being selected in step S12, i.e., when the drive position is determined as being selected in step S12 (step S12: No), the HEVCU 40 may estimate the deceleration torque to be transmitted to the drive wheels 5 after the shifting of the automatic transmission 30 into the lower stage is completed (step S16). The HEVCU 40 may set the target engine speed directed to increasing of the engine speed, and supply information regarding the set target engine speed to the ECU 11 (step S18). In response to reception of the information regarding the target engine speed, the ECU 11 may so control the engine 10 that the engine speed becomes the target engine speed (step S18). The engine speed may be increased by the control thus performed by the ECU 11.

Further, the HEVCU 40 may so set the instructed motor torque, on the basis of the deceleration torque estimated in step S16, that the regenerative torque is increased, and supply the information regarding the set instructed motor torque to the MCU 23 (step S20). In response to reception of the information regarding the instructed motor torque, the MCU 23 may so control the electric motor 20 that the regenerative torque becomes the instructed motor torque (step S20). The MCU 23 may perform the foregoing control of the electric motor 20 by controlling the inverter 21. The regenerative torque generated by the electric motor 20 may be increased by the control thus performed by the MCU 23. This increased regenerative torque may increase the deceleration torque transmitted to the drive wheels 5.

The HEVCU 40 may determine whether the predetermined time period has elapsed from the time at which the control is started (step S22). When the predetermined time period is determined in step S22 as not having elapsed from the time at which the control is started (step S22: No), the HEVCU 40 may return to the process in step S16. In contrast, when the predetermined time is determined in step S22 as having elapsed from the time at which the control is started (step S22: Yes), the HEVCU 40 may set the instructed motor torque and supply the information on the set instructed motor torque to the MCU 23 (step S24). The set instructed torque may be directed to gradual decreasing of the regenerative torque from the regenerative torque based on the deceleration torque estimated in step S16. In response to reception of the information regarding the instructed motor torque, the MCU 23 may so control the electric motor 20 that the regenerative torque becomes the instructed motor torque (step S24). The MCU 23 may perform the foregoing control of the electric motor 20 by controlling the inverter 21. The regenerative torque generated by the electric motor 20 may be decreased gradually by the control thus performed by the MCU 23. Thereafter, the control to be performed may return to the regular control.

According to the control apparatus 1 of the first implementation, when the shift operation is performed by the driver, the deceleration torque transmitted to the drive wheels 5 may be varied promptly after the shift operation is performed, by controlling the regenerative torque generated by the electric motor 20 to be increased. Hence, it is possible to improve responsiveness to the shift operation performed by the driver. In a case where the downshift operation is performed by the driver, while the shifting of the automatic transmission 30 into the lower stage is not actually completed (during a period in which the shifting control of the automatic transmission 30 is being performed), the increased regenerative torque may allow the torque equivalent to the deceleration torque that is increased through the engine braking generated when the shifting of the automatic transmission 30 into the lower stage is completed to be transmitted to the drive wheels 5. This makes it possible to increase the deceleration rate of the vehicle. In contrast, in a case where the upshift operation is performed by the driver, while the shifting of the automatic transmission 30 into the higher stage is not actually completed, the increased regenerative torque may allow the torque equivalent to the deceleration torque that is decreased through the engine braking generated when the shifting of the automatic transmission 30 into the higher stage is completed to be transmitted to the drive wheels 5. This makes it possible to decrease the deceleration rate of the vehicle. Hence, a feeling of driving of the driver with respect to the shift operation performed by the driver is improved.

According to the control apparatus 1 of the first implementation, a determination may be made as to whether the driver's intention is directed to deceleration or acceleration when the downshift operation is performed by the driver. This makes it possible to appropriately vary the deceleration torque transmitted to the drive wheels 5 by means of the regenerative torque. This makes it also possible to improve fuel consumption. According to the control apparatus 1 of the first implementation, it is possible to determine the driver's intention directed to deceleration or acceleration with higher accuracy on the basis of the accelerator pedal position detected by the accelerator pedal sensor 41.

For example, when the downshift operation is performed by the driver having the intention directed to deceleration, it may be possible to increase the deceleration torque by means of the regenerative torque generated by the electric motor 20. This makes it possible to increase the deceleration rate of the vehicle, to thereby perform deceleration of the vehicle, in response to the downshift operation performed by the driver having the intention directed to deceleration. In this case, an amount of electric power generated by the regeneration may be increased, and the SOC of the battery 22 may be thereby increased. In contrast, when the downshift operation is performed by the driver having the intention directed to acceleration, the deceleration torque may be prevented from being increased by means of the regenerative torque generated by the electric motor 20. This makes it possible to prevent unnecessary deceleration from being performed in response to the downshift operation performed by the driver having the intention directed to acceleration. Hence, it is possible to prevent deterioration of fuel consumption.

According to the control apparatus 1 of the first implementation, the control may be so performed that the engine speed of the engine 10 is increased when the downshift operation is performed by the driver. Such an increase in engine speed may cause the driver to feel as if the deceleration is caused by the engine braking. This improves the feeling of driving of the driver. Moreover, according to the control apparatus 1 of the first implementation, the regenerative torque generated by the electric motor 20 may be also increased in accordance with the increase in engine speed. This allows the electric motor 20 to generate electric power in a range of the regenerative torque that allows for higher regeneration efficiency. Accordingly, it is possible to efficiently increase the amount of electric power generated by the electric motor 20. It is also possible to absorb, by means of the regenerative torque, the amount of the increase in drive torque resulting from the increase in engine speed. This makes it possible to suppress a decrease in deceleration torque. Moreover, according to the control apparatus 1 of the first implementation, the control may be so performed that the engine speed of the engine 10 is decreased when the upshift operation is performed by the driver. Such a decrease in engine speed may cause the driver to feel as if the engine braking is decreased. This improves the feeling of driving of the driver.

According to the control apparatus 1 of the first implementation, the deceleration torque may be increased or decreased by utilizing a device such as the electric motor 20 or the inverter 21 provided in the hybrid electric vehicle. This may eliminate the necessity to separately provide a unit that improves responsiveness to the shift operation performed by the driver. Hence, it is possible to suppress cost.

According to a control apparatus for hybrid electric vehicle of one implementation of the technology, motor torque directed to decreasing of torque difference is generated, on a condition that a shift operation from a first stage into a second stage is performed by a driver, and first torque and second torque are different in magnitude from each other by the torque difference. The first torque is torque that is to be transmitted to the drive wheel during shifting of the automatic transmission from the first stage into the second stage. The second torque is torque that is to be transmitted to the drive wheel after the shifting of the automatic transmission from the first stage into the second stage is completed. As a result, while the shifting of the automatic transmission into the second stage is not yet completed actually after the shift operation is performed by the driver, torque that is closer to the torque to be generated after the shifting of the automatic transmission into the second stage is completed is transmitted to the drive wheel. The torque that is closer to the torque to be generated after the shifting of the automatic transmission into the second stage is completed includes torque equivalent to the torque generated after the shifting of the automatic transmission into the second stage is completed. Thus, it is possible to promptly cause variation in torque in accordance with the shift operation performed by the driver to occur. Hence, it is possible to improve responsiveness to the shift operation performed by the driver.

[Second Implementation]

Figure 5:
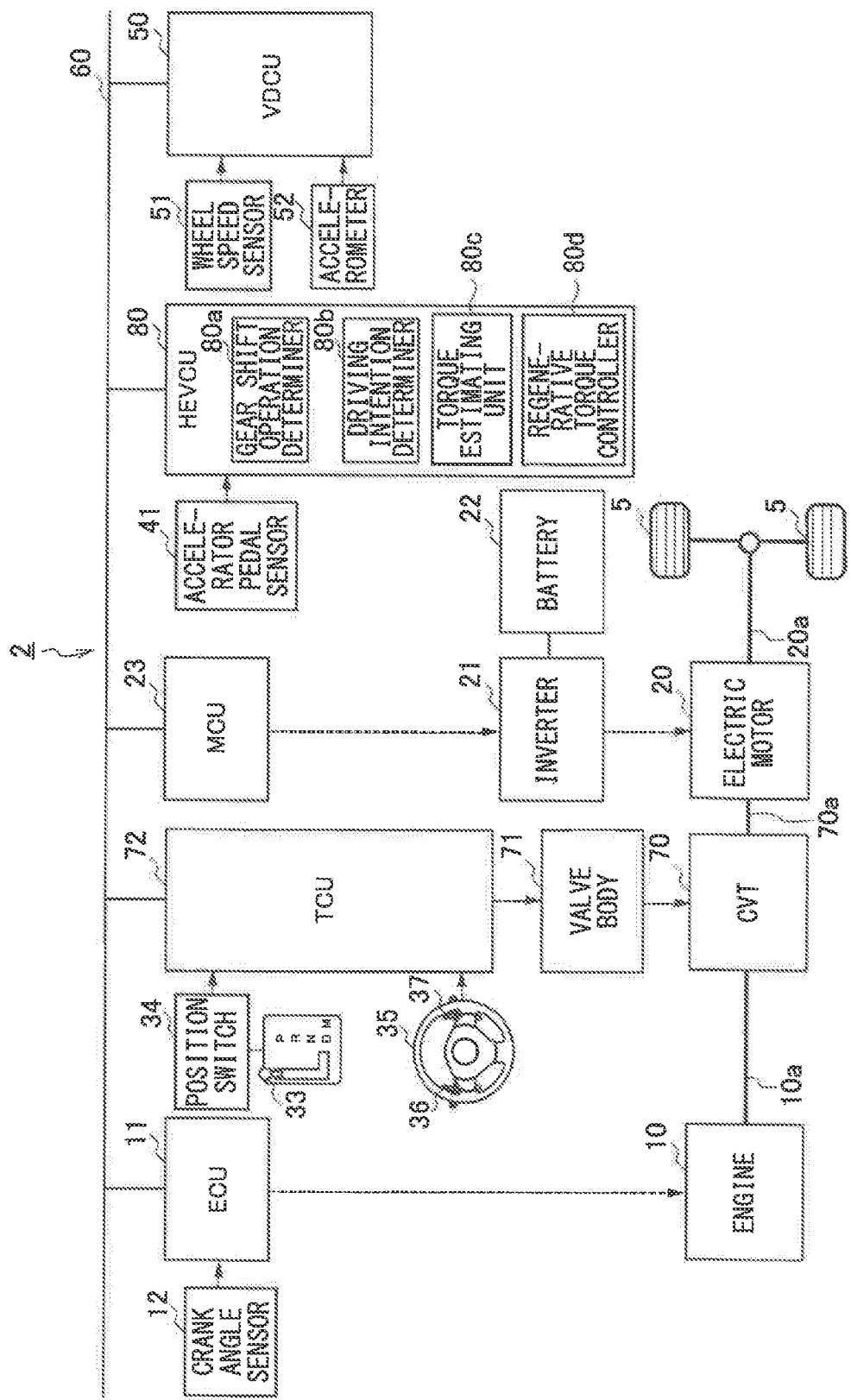
FIG. 5 is a block diagram illustrating an example of a configuration of a control apparatus for hybrid electric vehicle according to one implementation of the technology.

A second implementation of the technology is directed to one application example of a control apparatus 2 for hybrid electric vehicle provided with a chain-based CVT (Continuously Variable Transmission). The foregoing control apparatus will be hereinafter referred to as a "control apparatus 2". A description is given of the control apparatus 2 according to the second implementation with reference to FIG. 5. FIG. 5 illustrates a configuration of the control apparatus 2 according to the second implementation.

Compared with the control apparatus 1 according to the first implementation, the control apparatus 2 may be mounted on a hybrid electric vehicle provided with a CVT 70 instead of the step automatic transmission 30 as a transmission. A control performed by the control apparatus 2 may be partially different from that performed by the control apparatus 1, in accordance with the provision of the CVT 70.

The CVT 70 may be a transmission that automatically varies the speed ratio in a seamless manner. The CVT 70 may perform shifting between any number of stages by varying the speed ratio by multiple steps, e.g., in a stepwise manner, for example. The CVT 70 may have, as its shift mode, an automatic shift mode, a manual shift mode, and a temporary manual mode, for example, as with the automatic transmission 30 according to the first implementation.

The CVT 70 may include, for example, a torque converter, a forward-rearward traveling switching mechanism, and a variator. The torque converter may have a lockup clutch function and a torque amplifying function. The forward-rearward traveling switching mechanism may have a function that switches between forward rotation and reverse rotation of the drive wheels 5, i.e., between forward traveling and rearward traveling of the vehicle.

The variator may include a primary shaft and a secondary shaft that are disposed in parallel to each other. The primary shaft, i.e., an input shaft, may be coupled to the output shaft 10a of the engine 10 with a device such as the torque converter or the forward-rearward traveling switching mechanism in between. The secondary shaft, i.e., an output shaft 70a, may be coupled to the electric motor 20. The primary shaft may be provided with a primary pulley that includes a fixed pulley and a movable pulley. The secondary shaft may be provided with a secondary pulley that includes a fixed pulley and a movable pulley. Each of the primary pulley and the secondary pulley may be so configured that cone surface spacing between its fixed pulley and its movable pulley, i.e., a pulley gap width, is variable. A chain that transmits power may be so disposed around the primary pulley and the secondary pulley that the chain lays between the primary pulley and the secondary pulley. The variator may vary each of the pulley gap widths of the primary pulley and the secondary pulley to thereby vary a ratio (a pulley ratio) of a chain winding diameter relative to each of the primary pulley and the secondary pulley. The speed ratio may be thereby varied in a seamless manner.

The movable pulley of the primary pulley may be provided with a primary drive oil chamber. The movable pulley of the secondary pulley may be provided with a secondary drive oil chamber. A shift pressure that varies the pulley ratio (the speed ratio) may be introduced to the primary drive oil chamber, for example. A clamp pressure that prevents slipping of the chain may be introduced to the secondary drive oil chamber, for example. A hydraulic pressure of each of the primary drive oil chamber and the secondary drive oil chamber may be controlled by a valve body 71.

The valve body 71 may supply a hydraulic pressure to a member of the CVT 70 such as the torque converter, the forward-rearward traveling switching mechanism, or the respective drive oil chambers of the variator. The valve body 71 may be provided with a control valve mechanism built in the valve body 71, as with the valve body 31 according to the first implementation. The valve body 71 may be controlled by a TCU 72.

The TCU 72 may control the CVT 70 by controlling the valve body 71. The TCU 72 may include devices such as a microprocessor, a ROM, a RAM, a backup RAM, and an input-output I/F, as with the TCU 32 according to the first implementation. The TCU 72 may be coupled to various switches such as the position switch 34, the minus paddle switch 36, or the plus paddle switch 37, to thereby acquire information necessary for the control performed by the TCU 72.

The TCU 72 may switch the shift mode to the automatic shift mode when the drive position is detected by the position switch 34 as being selected. In the automatic shift mode, the TCU 72 may control the valve body 71 to thereby automatically vary, on the basis of a shifting map, the speed ratio in accordance with the driving state of the vehicle, for example. In one example, the TCU 72 may perform a multiple-step-like control that varies the speed ratio (the stage) by multiple steps. For example, in the multiple-step-like control, the TCU 72 may so set a target value of a primary rotation speed that any stage in accordance with the driving state of the vehicle is achieved. Further, the TCU 72 may generate a shift pressure by so controlling each solenoid valve of the valve body 71 as to cause the actual primary rotation speed to be the target primary speed. The TCU 72 may thereby vary the speed ratio (the stage). The shifting map may be stored, for example, in the ROM of the TCU 72.

The TCU 72 may switch the shift mode to the manual shift mode when the manual position is determined by the position switch 34 as being selected. Alternatively, the TCU 72 may switch the shift mode to the temporary manual mode when any of the minus paddle switch 36 and the plus paddle switch 37 is operated during the automatic shift mode. For example, when an operation corresponding to the discontinuation condition of the temporary manual mode described above is performed, the TCU 72 may switch the shift mode to the automatic shift mode. In any of the manual shift mode and the temporary manual mode, the TCU 72 may so control, through the multiple-step-like control described above, the valve body 71 that downshift into an adjacent lower stage is performed through varying of the speed ratio when the minus paddle switch 36 is operated. When the plus paddle switch 37 is operated, the TCU 72 may so control, through the multiple-step-like control described above, the valve body 71 that upshift into adjacent higher stage is performed through varying of the speed ratio.

As described above, when the shift operation is performed by the driver by means of any of the minus paddle switch 36 and the plus paddle switch 37, the hydraulic pressures of the respective drive oil chambers of the variator of the CVT 70 may be controlled by the TCU 72 and the valve body 71. Such a control of the hydraulic pressures may cause the respective pulley gap widths of the primary pulley and the secondary pulley of the variator to be varied gradually in a course of shifting of the CVT 70. In other words, such a control of the hydraulic pressures may gradually vary the speed ratio during the transition of the shifting of the CVT 70. Thus, the speed ratio may be varied to that of the lower stage when the minus paddle switch 36 is operated, and the speed ratio may be varied to that of the higher stage when the plus paddle switch 37 is operated. The shifting of the CVT 70 may be performed through such gradual variation in speed ratio. It may therefore take time until the shifting of the CVT 70 into the lower stage or into the higher stage is completed. Accordingly, for example, in a case where the deceleration of the vehicle is performed, the engine braking may be also varied gradually in accordance with the variation in speed ratio until the shifting of the CVT 70 is completed. Therefore, the deceleration torque derived from the engine braking may also be varied gradually until the shifting of the stage of the CVT 70 is performed. Accordingly, when the shifting of the CVT 70 into the lower stage is performed, the deceleration torque during the shifting of the CVT 70 may be insufficient relative to the deceleration torque to be generated after the shifting is completed. In other words, the deceleration torque during the shifting of the CVT 70 may become smaller than the deceleration torque to be generated after the shifting is completed. It is to be noted that an amount by which the deceleration torque is insufficient may be decreased gradually. When the shifting of the CVT 70 into the higher stage is performed, the deceleration torque during the shifting of the CVT 70 may be excessive relative to the deceleration torque to be generated after the shifting is completed. In other words, the deceleration torque during the shifting of the CVT 70 may become greater than the deceleration torque to be generated after the shifting is completed. It is to be noted that an amount by which the deceleration torque is excessive may be decreased gradually.

Therefore, when the shift operation is performed by the driver during deceleration of the vehicle, the control apparatus 2 may so control regenerative torque generated by the electric motor 20 that deceleration torque to be generated in the stage selected through the shift operation is generated, during the shifting of the CVT 70, i.e., while the speed ratio of the CVT 70 is varied. Each process to be performed by the control apparatus 2 may be executed by the MCU 23 and an HEVCU 80. The units such as the MCU 23, the HEVCU 80, the ECU 11, the TCU 72, or the VDCU 50 may be able to perform mutual communication with each other to thereby supply or receive, for example, various pieces of information or various signals. Such mutual communication may be achieved, for example, through the CAN 60. It is to be noted that, although the control apparatus 1 according to the first implementation may perform the control regarding the engine speed in addition to the control regarding the regenerative torque, the control apparatus 2 may not perform the control regarding the engine speed.

The HEVCU 80 may perform a general control of the hybrid electric vehicle. The HEVCU 80 may include devices such as a microprocessor, a ROM, a RAM, a backup RAM, or an input-output I/F, as with the TCU 72. The HEVCU 80 may be coupled to various sensors such as the accelerator pedal sensor 41 to thereby obtain information necessary for the control performed by the HEVCU 80. The HEVCU 80 may obtain various pieces of information through the CAN 60. For example, information regarding an engine speed may be obtained from the ECU 11, information regarding a selected position detected by the position switch 34 may be obtained from the TCU 72, information regarding an operation performed on each of the minus paddle switch 36 and the plus paddle switch 37 may be obtained from the TCU 72, and information regarding a vehicle speed or information regarding a slope of a road surface may be obtained from the VDCU 50, as the various pieces of information obtained through the CAN 60.

For example, as with the HEVCU 40 according to the first implementation, the HEVCU 80 may calculate a factor such as the requested engine drive force of the engine 10 or the instructed motor torque of the electric motor 20, and supply pieces of information regarding the calculated factor such as the requested engine drive force and the instructed motor torque to the ECU 11 and the MCU 23, respectively, through the CAN 60.

In one example, the HEVCU 80 may include a shift operation determiner 80*a*, a driving intention determiner 80*b*, a torque estimating unit 80*c*, and a regenerative torque controller 80*d*, to thereby achieve each process of the control apparatus 2. The HEVCU 80 may cause a function of each of the shift operation determiner 80*a*, the driving intention determiner 80*b*, the torque estimating unit 80*c*, and the regenerative torque controller 80*d* to be achieved, by causing the microprocessor to execute each program stored in a storage such as the ROM. In one implementation, the shift operation determiner 80*a* may serve as the "shift operation detector". In one implementation, the driving intention determiner 80*b* may serve as the "estimated driving action determiner". In one implementation, the torque estimating unit 80*c* may serve as the "torque estimating unit".

The shift operation determiner 80*a*, the driving intention determiner 80*b*, and the torque estimating unit 80*c* may perform processes similar to the processes performed by the shift operation determiner 40*a*, the driving intention determiner 40*b*, and the torque estimating unit 40*c* of the HEVCU 40 according to the first implementation, respectively. Therefore, a description of each of the shift operation determiner 80*a*, the driving intention determiner 80*b*, and the torque estimating unit 80*c* is omitted.

On a condition that the downshift operation is determined by the shift operation determiner 80*a* as being performed and the driver's intention is determined by the driving intention determiner 80*b* as being directed to deceleration, the regenerative torque controller 80*d* may repeatedly set instructed motor torque and supply information regarding the set instructed motor torque to the MCU 23 every time the regenerative torque controller 80*d* sets the instructed motor torque, until the shifting of the CVT 70 into a lower stage is completed. The instructed motor torque may be set on the basis of the deceleration torque estimated by the torque estimating unit 80*c*. The instructed motor torque may be, for example, the instructed value of the regenerative torque. In one example, the instructed motor torque may be set to torque that is gradually decreased from the deceleration torque estimated by the torque estimating unit 80*c* as time elapses, e.g., in accordance with the deceleration torque generated through the engine braking that is increased in accordance with variation in speed ratio of the CVT 70. In the case of the CVT 70, the speed ratio may be varied gradually during the shifting of the CVT 70, and as a result, the deceleration torque generated through the engine braking may be also varied gradually. For example, when the downshift operation is performed, an absolute value of the deceleration torque estimated by the torque estimating unit 80*c*, i.e., the deceleration torque including the torque to be generated through the engine braking after the shifting of the CVT 70 into the lower stage is completed, may be greater than an absolute value of the deceleration torque before the shifting of the CVT 70 into the lower stage is performed. Therefore, the deceleration torque transmitted to the drive wheels 5 may be increased by increasing, on the basis of the instructed motor torque, the regenerative torque generated by the electric motor 20. After the control of the shifting is started, the engine braking may be increased gradually in accordance with the variation in speed ratio as time elapses. The deceleration torque generated through the engine braking may be thereby increased gradually. Therefore, the instructed motor torque (the absolute value of the instructed motor torque) may be increased by a predetermined amount at the time when the control is started, and the instructed motor torque (the absolute value of the instructed motor torque) may be decreased gradually thereafter as time elapses.

On a condition that the upshift operation is determined by the shift operation determiner 80*a* as being performed, the regenerative torque controller 80*d* may set instructed motor torque, and supply information regarding the set instructed motor torque to the MCU 23. The regenerative torque controller 80*d* may set the instructed motor torque until the shifting of the CVT 70 into a higher stage is completed. The instructed motor torque may be set on the basis of the deceleration torque estimated by the torque estimating unit 80*c*. In one example, the instructed motor torque may be set to torque that is gradually increased from the deceleration torque estimated by the torque estimating unit 80*c* as time elapses, e.g., in accordance with the deceleration torque, generated through the engine braking, that is decreased in accordance with variation in speed ratio of the CVT 70. When the upshift operation is performed, an absolute value of the deceleration torque estimated by the torque estimating unit 80*c*, i.e., the deceleration torque including the torque to be generated through the engine braking after the shifting of the CVT 70 into the higher stage is completed, may be smaller than an absolute value of the deceleration torque before the shifting of the CVT 70 is performed. Therefore, the deceleration torque transmitted to the drive wheels 5 may be decreased by decreasing, on the basis of the instructed motor torque, the regenerative torque generated by the electric motor 20, when the regenerative torque of any magnitude is generated in accordance with an operation performed on a brake pedal by the driver upon the shift operation. After the control of the shifting is started, the engine braking may be decreased gradually in accordance with the variation in speed ratio as time elapses. The deceleration torque generated through the engine braking may be thereby decreased gradually. Therefore, the instructed motor torque (the absolute value of the instructed motor torque) may be decreased by a predetermined amount at the time when the control is started, and the instructed motor torque (the absolute value of the instructed motor torque) may be increased gradually thereafter as time elapses.

One example of a method of obtaining or estimating the deceleration torque generated through the engine braking that varies as time elapses after the control of the shifting may use a map. For example, searching through the map may be performed on the basis of the stage at the time when the shift operation is performed, the vehicle speed at the time when the shift operation is performed, the slope of the road surface at the time when the shift operation is performed, and the time period that has elapsed from the time at which the control of the shifting is started, to thereby obtain the deceleration torque to be generated through the engine braking. For example, the map may be provided for each stage at the time when the shift operation is performed. In the map, the deceleration torque to be generated through the engine braking may be stored in association with the vehicle speed, the slope of the road surface, and the time period that has elapsed from the time at which the control of the shifting is started. The map may be stored, for example, in the ROM of the HEVCU 80.

Figure 6:
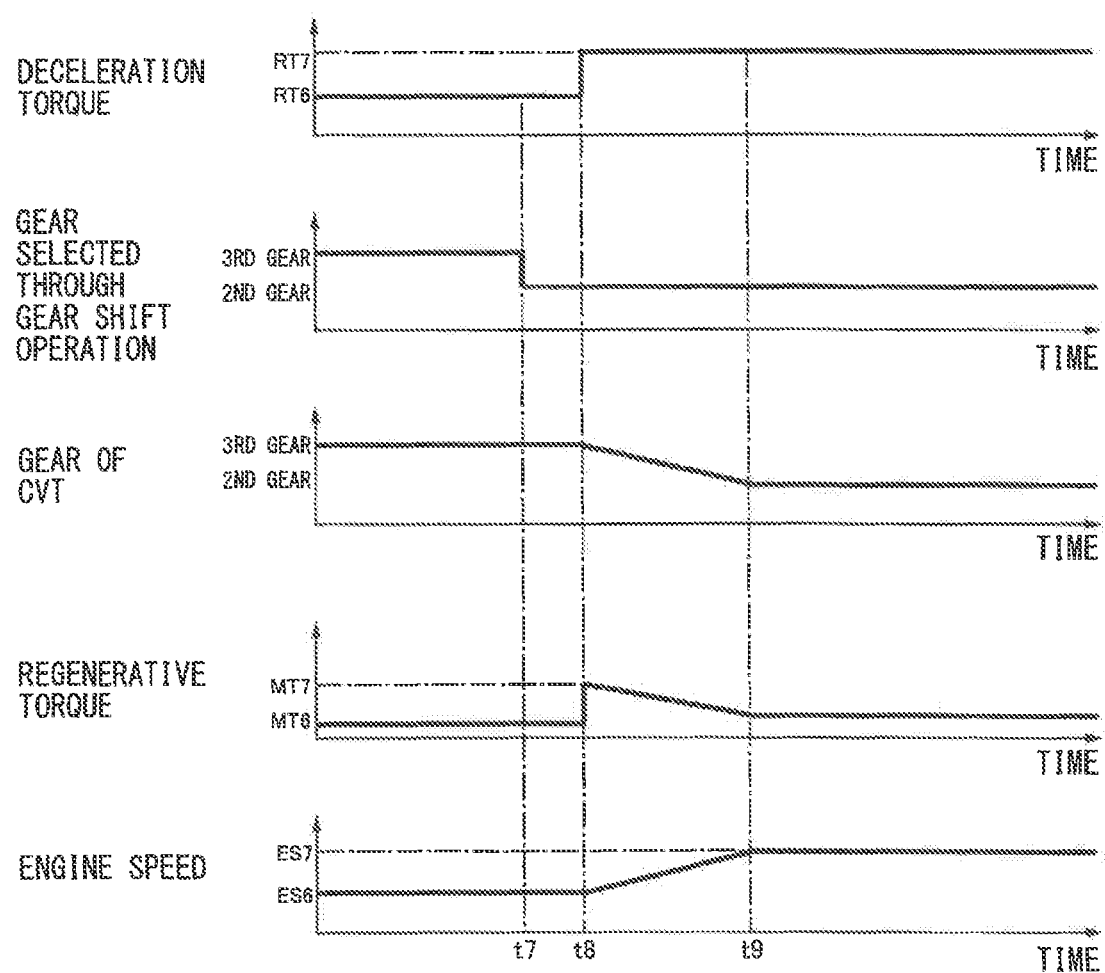
FIG. 6 is a diagram illustrating an example of a timing chart regarding a control to be performed by the control apparatus for hybrid electric vehicle according to one implementation of the technology, and illustrates an example case of performing a downshift operation from a third stage into a second stage.

A description is given next of one example of timing of variation in each of the regenerative torque, the engine speed, and the deceleration torque transmitted to the drive wheels 5, with reference to FIG. 6. The foregoing variation in each of the regenerative torque, the engine speed, and the deceleration torque transmitted to the drive wheels 5 may be caused by a control performed by the control apparatus 2 on a condition that the downshift operation is performed by the driver having the intention directed to deceleration, during the deceleration of the vehicle. FIG. 6 illustrates one example of a timing chart regarding the control performed by the control apparatus 2. A horizontal axis of the timing chart illustrated in FIG. 6 indicates time. FIG. 6 illustrates, in order from the top, a graph indicating the deceleration torque transmitted to the drive wheels 5, a graph indicating the stage selected through the shift operation performed by the driver, a graph indicating the stage of the CVT 70, a graph indicating the regenerative torque generated by the electric motor 20, and a graph indicating the engine speed of the engine 10.

At time t7, a downshift operation from a third stage into a second stage may be performed by the driver by means of the minus paddle switch 36. In response to the downshift operation performed by the driver, the hydraulic pressure control directed to shifting of the CVT 70 from the third stage into the second stage may be performed by the TCU 72 and the valve body 71. In other words, the hydraulic pressure control directed to varying of the speed ratio of the CVT 70 from that of the third stage into that of the second stage may be performed by the TCU 72 and the valve body 71. This hydraulic pressure control may cause the shifting of the CVT 70 to be started at time t8. In other words, this hydraulic pressure control may cause varying of the speed ratio of the CVT 70 to be started at the time t8. The shifting of the CVT 70 may be completed at time t9. In other words, the speed ratio of the CVT 70 may be set to that of the second stage. In accordance with this variation in speed ratio, the engine speed may be increased gradually from ES6 to ES7, and the engine braking may be therefore increased gradually.

Further, in response to the downshift operation performed by the driver, a control that increases the regenerative torque may be performed by the MCU 23 and the inverter 21 in accordance with a command given by the HEVCU 80. As a result of the control performed by the MCU 23, the regenerative torque generated by the electric motor 20 may be increased at time t8 by a predetermined amount. For example, the regenerative torque generated by the electric motor 20 may be increased from MT6 to MT7 at the time t8. Further, from the time t8 to the time t9, the regenerative torque generated by the electric motor 20 may be decreased gradually from MT7 in accordance with an increase in deceleration torque generated through the engine braking.

The increased regenerative torque may cause the deceleration torque transmitted to the drive wheels 5 to be increased at the time t8. For example, the deceleration torque transmitted to the drive wheels 5 may be increased from RT6 to RT7 at the time t8. The deceleration torque RT7 after the foregoing increase in deceleration torque may be equivalent to the deceleration torque including the torque to be generated through the engine braking that is generated when the shifting of the CVT 70 into the second stage is completed. This deceleration torque RT7 after the increase in deceleration torque may increase the deceleration rate of the vehicle.

Further, at time t9, i.e., when the stage of the CVT 70 is set to the second stage, the HEVCU 80 may return to the regular control. This regular control may cause the regenerative torque to be slightly greater than the regenerative torque MT6 at the time when the control is started. Further, an engine speed ES7 that is in accordance with the speed ratio of the second stage of the CVT 70 may be achieved at the time t9. The engine speed ES7 may be greater than the engine speed ES6. The deceleration torque generated through the engine braking may be thereby increased. The deceleration torque transmitted to the drive wheels 5 may be the deceleration torque RT7, and may not be varied in magnitude from and after the time t8. The deceleration torque RT7 may include torque such as the increased deceleration torque generated through the engine braking.

Figure 7:
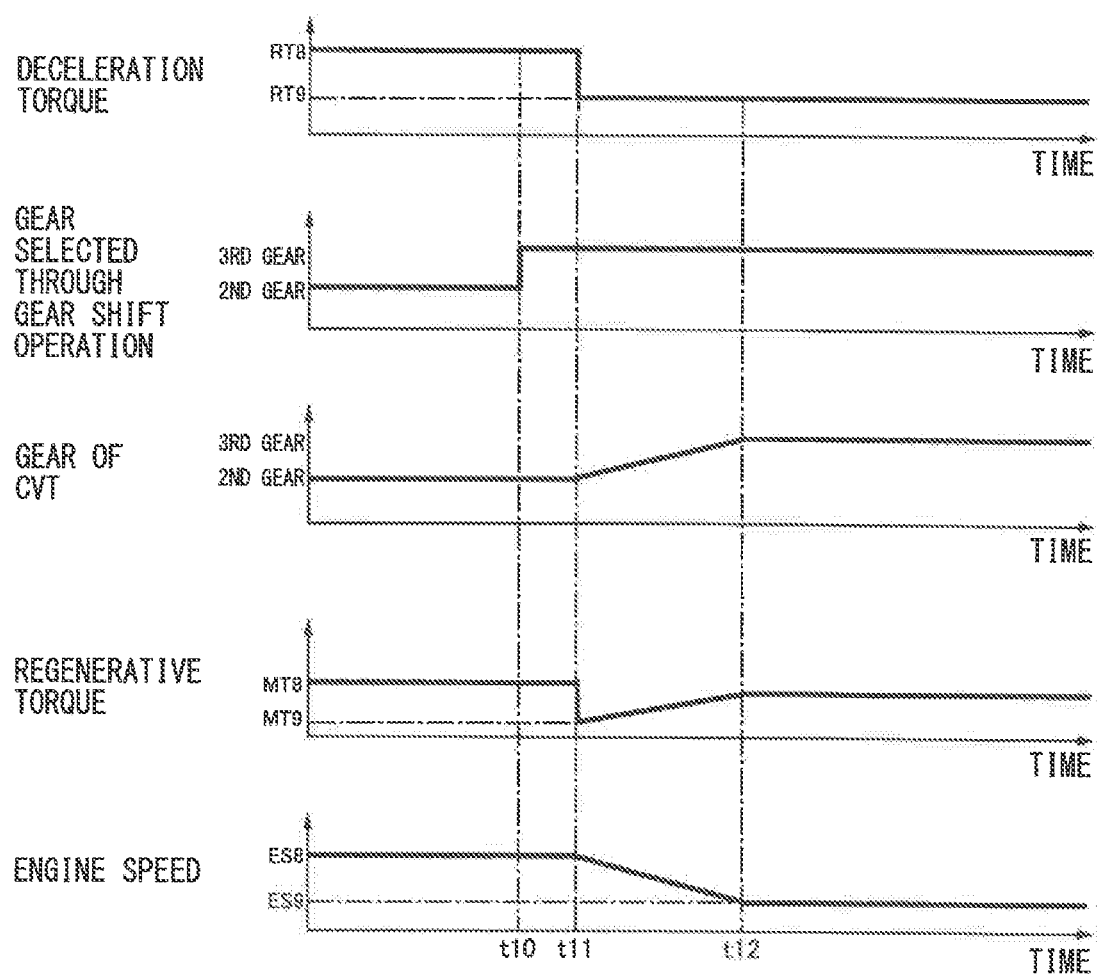
FIG. 7 is a diagram illustrating an example of a timing chart regarding a control to be performed by the control apparatus for hybrid electric vehicle according to one implementation of the technology, and illustrates an example case of performing an upshift operation from the second stage into the third stage.

A description is given next of one example of timing of variation in each of the regenerative torque, the engine speed, and the deceleration torque transmitted to the drive wheels 5, with reference to FIG. 7. The foregoing variation in each of the regenerative torque, the engine speed, and the deceleration torque transmitted to the drive wheels 5 may be caused by a control performed by the control apparatus 2 on a condition that the upshift operation is performed by the driver during the deceleration of the vehicle. FIG. 7 illustrates an example case where regenerative torque having any magnitude is generated at the time when the shift operation is performed by the driver. FIG. 7 illustrates one example of a timing chart regarding the control performed by the control apparatus 2. A horizontal axis of the timing chart illustrated in FIG. 7 indicates time. FIG. 7 illustrates, in order from the top, a graph indicating the deceleration torque transmitted to the drive wheels 5, a graph indicating the stage selected through the shift operation performed by the driver, a graph indicating the stage of the CVT 70, a graph indicating the regenerative torque generated by the electric motor 20, and a graph indicating the engine speed of the engine 10.

At time t10, an upshift operation from a second stage into a third stage may be performed by the driver by means of the plus paddle switch 37. In response to the upshift operation performed by the driver, the hydraulic pressure control directed to shifting of the CVT 70 from the second stage into the third stage may be performed by the TCU 72 and the valve body 71. In other words, the hydraulic pressure control directed to varying of the speed ratio of the CVT 70 from that of the second stage into that of the third stage may be performed by the TCU 72 and the valve body 71. This hydraulic pressure control may cause the shifting of the CVT 70 to be started at time t11. In other words, the hydraulic pressure control may cause varying of the speed ratio of the CVT 70 to be started at the time t11. The shifting of the CVT 70 may be completed at the time t12. In other words, the speed ratio of the CVT 70 may be set to the speed ratio of the third stage at the time t12. In accordance with this variation in speed ratio, the engine speed may be decreased gradually from ES8 to ES9, and the engine braking may be therefore decreased gradually.

Further, in response to the upshift operation performed by the driver, a control that decreases the regenerative torque may be performed by the MCU 23 and the inverter 21 in accordance with a command given by the HEVCU 80. As a result of the control performed by the MCU 23, the regenerative torque generated by the electric motor 20 may be decreased at time t11 by a predetermined amount. For example, the regenerative torque generated by the electric motor 20 may be decreased from MT8 to MT9 at the time t11. Further, from the time t11 to time t12, the regenerative torque generated by the electric motor 20 may be increased gradually from MT9 in accordance with a decrease in deceleration torque generated through the engine braking.

The decreased regenerative torque may cause the deceleration torque transmitted to the drive wheels 5 to be decreased at the time t11. For example, the deceleration torque transmitted to the drive wheels 5 may be decreased from RT8 to RT9 at the time t11. The deceleration torque RT9 after the foregoing decrease in deceleration torque may be equivalent to the deceleration torque including the torque generated through the engine braking that is generated when the shifting of the CVT 70 into the third stage is completed. This deceleration torque RT9 after the decrease in deceleration torque may decrease the deceleration rate of the vehicle.

Further, at the time t12, i.e., when the stage of the CVT 70 is set to the third stage, the HEVCU 80 may return to the regular control. This regular control may cause the regenerative torque to be slightly smaller than the regenerative torque MT8 at the time when the control is started. Further, an engine speed ES9 that is in accordance with the speed ratio of the third stage of the CVT 70 may be achieved at the time t12. The engine speed ES9 may be smaller than an engine speed ES8. The deceleration torque generated through the engine braking may be thereby decreased. The deceleration torque transmitted to the drive wheels 5 may be the deceleration torque RT9 including torque such as the decreased deceleration torque generated through the engine braking, and may not be varied in magnitude from and after the time t11.

The control apparatus 2 according to the second implementation may have effects similar to those of the control apparatus 1 according to the first implementation. However, the control apparatus 2 according to the second implementation may not perform the control regarding the engine speed, and therefore may not have the effect regarding the control of the engine speed which is achieved by the control apparatus 1 according to the first implementation.

[Third Implementation]

Figure 8:
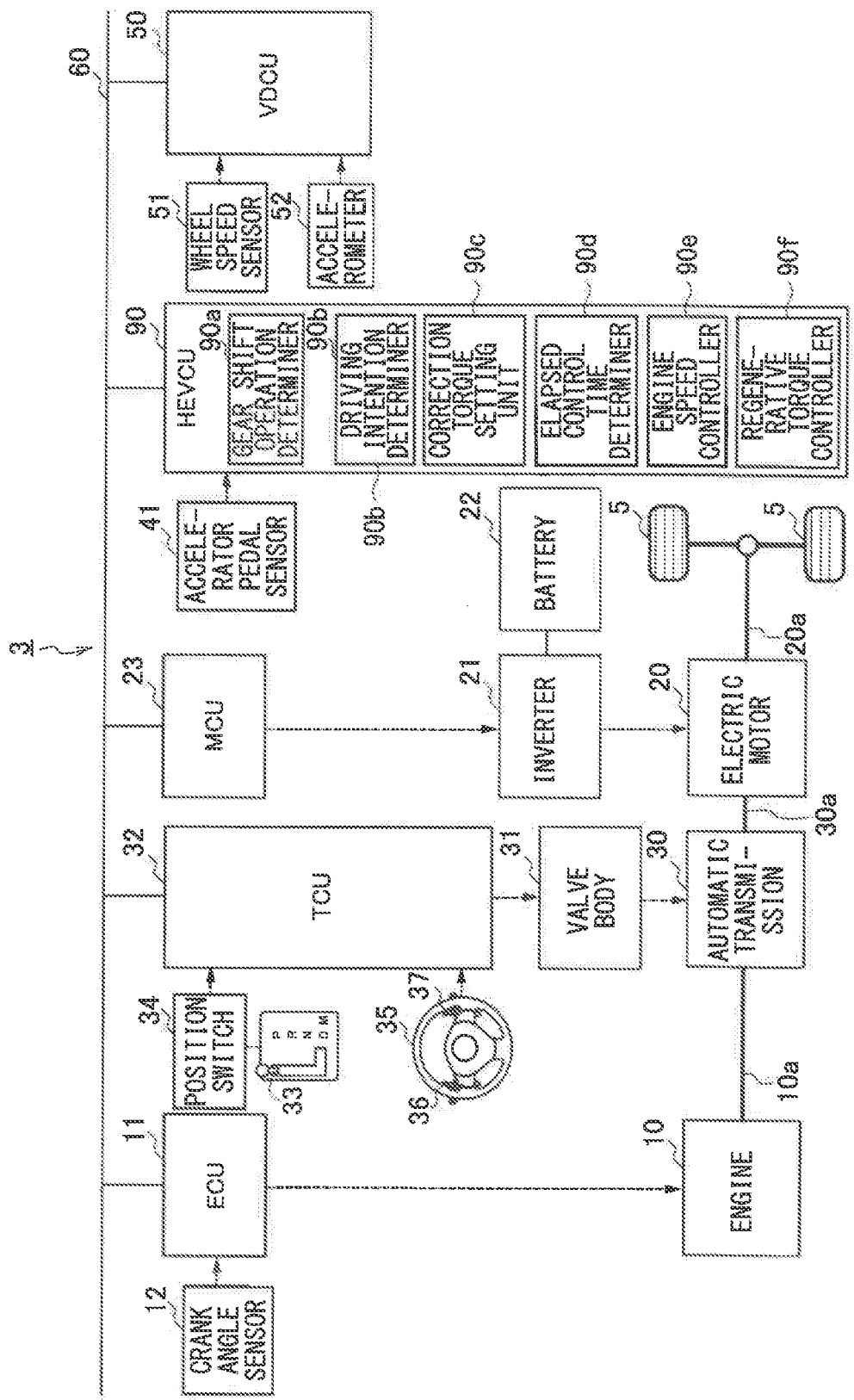
FIG. 8 is a block diagram illustrating an example of a configuration of a control apparatus for hybrid electric vehicle according to one implementation of the technology.
Figure 9:
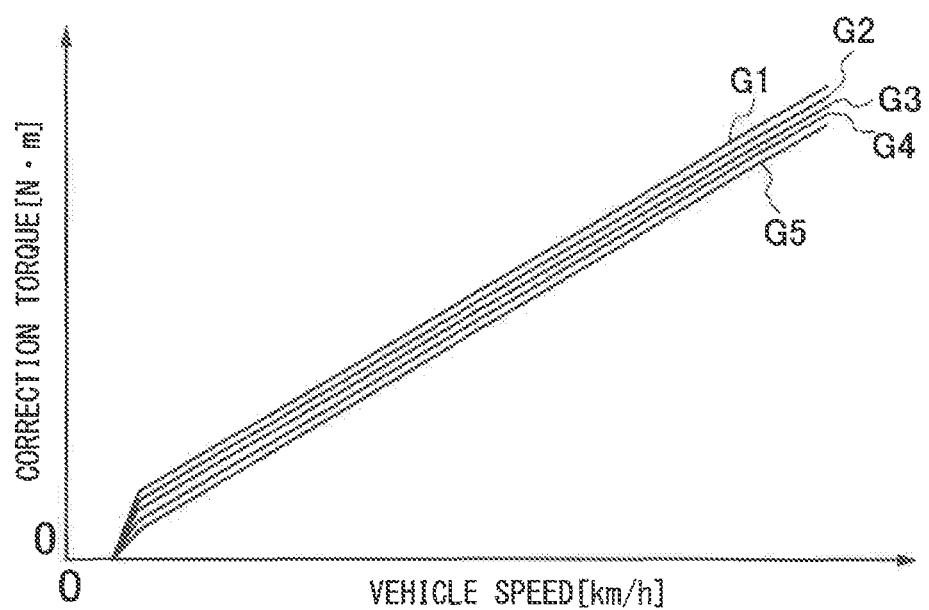
FIG. 9 is a diagram illustrating an example of a correction torque map for a correction torque setting unit illustrated in FIG. 8.

A third implementation of the technology refers to one application example of a control apparatus for hybrid electric vehicle provided with the step automatic transmission 30. The foregoing control apparatus will be hereinafter referred to as a "control apparatus 3". A description is given of the control apparatus 3 according to the third implementation with reference to FIGS. 8 and 9. FIG. 8 illustrates a configuration of the control apparatus 3 according to the third implementation. FIG. 9 illustrates one example of a correction torque map directed to the use by a correction torque setting unit 90c illustrated in FIG. 8.

The control apparatus 3 may be different from the control apparatus 1 according to the first implementation in a method of setting the instructed motor torque in the regenerative torque control. For example, the control apparatus 3 may set correction torque, and set the instructed motor torque on the basis of the set correction torque and the requested motor torque. The correction torque may be regenerative torque that is to be added to the requested motor torque. Each process to be performed by the control apparatus 3 may be executed by the ECU 11, the MCU 23, and an HEVCU 90. The HEVCU 90 may include a shift operation determiner 90a, a driving intention determiner 90b, a correction torque setting unit 90c, an elapsed control time determiner 90d, an engine speed controller 90e, and a regenerative torque controller 90f, to thereby achieve processes of the control apparatus 3. The HEVCU 90 may cause a function of each of the shift operation determiner 90a, the driving intention determiner 90b, the correction torque setting unit 90c, the elapsed control time determiner 90d, the engine speed controller 90e, and the regenerative torque controller 90f, by causing the microprocessor to execute each program stored in a storage such as the ROM. In one implementation, the shift operation determiner 90a may serve as the "shift operation detector". In one implementation, the driving intention determiner 90b may serve as the "estimated driving action determiner". In one implementation, the correction torque setting unit 90c may serve as a "correction torque setting unit".

The shift operation determiner 90a, the driving intention determiner 90b, the elapsed control time determiner 90d, and the engine speed controller 90e may perform processes similar to the processes performed by the shift operation determiner 40a, the driving intention determiner 40b, the elapsed control time determiner 40d, and the engine speed controller 40e of the HEVCU 40 according to the first implementation, respectively. Therefore, a description of each of the shift operation determiner 90a, the driving intention determiner 90b, the elapsed control time determiner 90d, and the engine speed controller 90e is omitted.

The correction torque setting unit 90c may set the correction torque in a case where any of the downshift operation and the upshift operation is determined by the shift operation determiner 90a as being performed. The correction torque may be directed to increasing of the regenerative torque. For example, the correction torque setting unit 90c may use the correction torque map for the stage at the time when the shift operation is performed. The correction torque setting unit 90c may perform searching through the correction torque map on the basis of the vehicle speed and the slope of the road surface, and calculate the correction torque, i.e., torque corresponding to an amount of increase to be made in regenerative torque, on the basis of a value obtained by the searching. As the correction torque map, a map directed to the downshift operation and a map directed to the upshift operation may be provided. For example, the correction torque map may be provided for each stage at the time when the shift operation is performed. In the correction torque map, the correction torque may be stored in association with the vehicle speed and the slope of the road surface. The correction torque map may be stored, for example, in the ROM of the HEVCU 90.

FIG. 9 illustrates a graph of one example of the correction torque map. A horizontal axis of the graph illustrated in FIG. 9 indicates the vehicle speed in kilometer per hour (km/h), and a vertical axis thereof indicates the correction torque in newton meter (N·m). FIG. 9 illustrates an example of the correction torque map including five graphs, i.e., graphs G1, G2, G3, G4, and G5. The graph G1 is a map of a case where the slope of the road surface is 10%, which is an upward slope road. The graph G2 is a map of a case where the slope of the road surface is 5%, which is an upward slope road. The graph G3 is a map of a case where the slope of the road surface is 0%, which is a flat road. The graph G4 is a map of a case where the slope of the road surface is −5%, which is a downward slope road. The graph G5 is a map of a case where the slope of the road surface is −10%, which is a downward slope road. As can be appreciated from the example illustrated in FIG. 9, greater correction torque may be set for greater upward slope, and smaller correction torque may be set for a greater downward slope, in the correction torque map. Further, greater correction torque may be set for a higher vehicle speed in the correction torque map. Further, the correction torque may be set to 0 (zero) in a region in which the vehicle speed is low, in the correction torque map.

By thus setting the correction torque to 0 (zero) in the region in which the vehicle speed is low in the correction torque map, the correction control of the regenerative torque may be prevented from being performed in the region in which the vehicle speed is low. In other words, the correction control of the regenerative torque may be disabled in the region in which the vehicle speed is low. In one alternative example, the correction torque may be also set for the region in which the vehicle speed is low in the correction torque map, and the set value of the correction torque may be replaced by 0 (zero) when the vehicle speed becomes a predetermined vehicle speed or lower. The correction control of the regenerative torque may be thus disabled. In this case, a vehicle speed region in which the correction control of the regenerative torque is disabled may be made variable by allowing the value of the predetermined vehicle speed to be variable in accordance with a condition such as the slope of the road surface.

On any of: a condition that the downshift operation is determined by the shift operation determiner 90a as being performed and the driver's intention is determined by the driving intention determiner 90b as being directed to deceleration; and a condition that the upshift operation is determined by the shift operation determiner 90a as being performed, the regenerative torque controller 90f may repeatedly add the value of the correction torque set by the correction torque setting unit 90c to the value of the requested motor torque, and supply the value of the sum value resulting from the foregoing addition to the MCU 23 as a value of the instructed motor torque every time the regenerative torque controller 90f performs the addition, until the predetermined time period is determined by the elapsed control time determiner 90d as having elapsed. It is to be noted that, in a case where the downshift operation is performed, the engine speed may be controlled to be increased by the engine speed controller 90e, as described in the first implementation. Therefore, in a case where torque corresponding to an amount of the increase in the drive torque resulting from the increase in engine speed is transmitted to the drive wheels 5, an amount of the regenerative torque to absorb the amount of the increase in the drive torque may be added to the instructed motor torque, e.g., to the correction torque.

After the predetermined time period is determined by the elapsed control time determiner 90d as having elapsed, the regenerative torque controller 90f may gradually decrease the value of the correction torque from that set by the correction torque setting unit 90c. Further, the regenerative torque controller 90f may add the value of the decreased correction torque to the value of the requested motor torque. Further, the regenerative torque controller 90f may supply the sum value resulting from the foregoing addition to the MCU 23 as the value of the instructed motor torque. For example, the regenerative torque controller 90f may gradually decrease the value of the correction torque repeatedly until the value of the decreased correction torque becomes 0 (zero). One example of a method of decreasing the torque may be similar to that described in the first implementation. The correction torque (the instructed motor torque) thus decreased gradually may allow the regenerative torque generated by the electric motor 20 to be decreased in correspondence with the deceleration torque generated through the engine braking in the last part of the regenerative torque control. The engine braking may be increased, in magnitude, in accordance with the engaging state of the engaging member of the automatic transmission 30.

Figure 10:
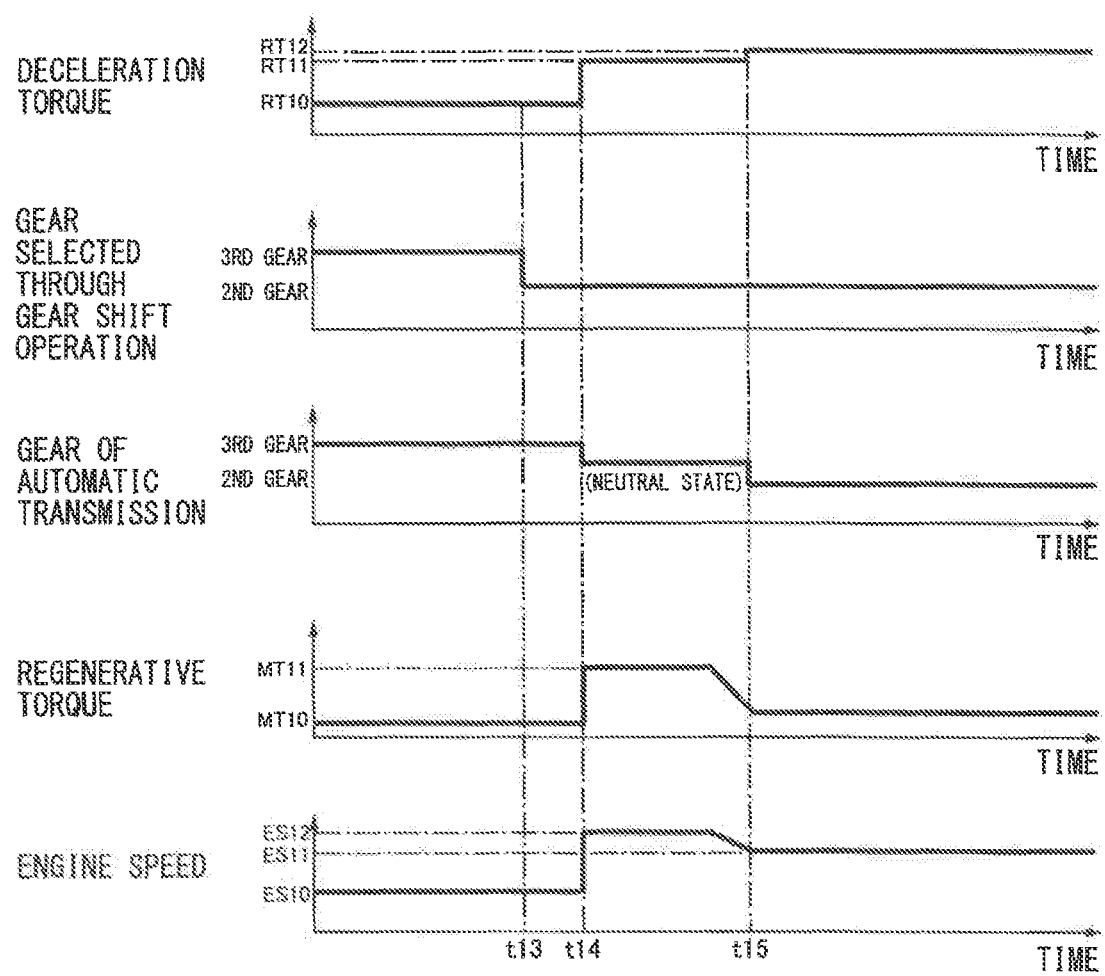
FIG. 10 is a diagram illustrating an example of a timing chart regarding a control to be performed by the control apparatus for hybrid electric vehicle according to one implementation of the technology, and illustrates an example case of performing a downshift operation from a third stage into a second stage.

A description is given next of one example of timing of variation in each of the regenerative torque, the engine speed, and the deceleration torque transmitted to the drive wheels 5, with reference to FIG. 10. The foregoing variation in each of the regenerative torque, the engine speed, and the deceleration torque transmitted to the drive wheels 5 may be caused by a control performed by the control apparatus 3 on a condition that the downshift operation is performed by the driver having the intention directed to deceleration, during the deceleration of the vehicle. FIG. 10 illustrates one example of a timing chart regarding the control performed by the control apparatus 3. A horizontal axis of the timing chart illustrated in FIG. 10 indicates time. FIG. 10 illustrates, in order from the top, a graph indicating the deceleration torque transmitted to the drive wheels 5, a graph indicating the stage selected through the shift operation performed by the driver, a graph indicating the stage of the automatic transmission 30, a graph indicating the regenerative torque generated by the electric motor 20, and a graph indicating the engine speed of the engine 10, as with FIG. 2 related to the first implementation.

At time t13, a downshift operation from a third stage into a second stage may be performed by the driver by means of the minus paddle switch 36. In response to the downshift operation performed by the driver, the hydraulic pressure control directed to shifting of the automatic transmission 30 from the third stage into the second stage may be performed by the TCU 32 and the valve body 31. This hydraulic pressure control may cause the shifting of the automatic transmission 30 to be started at time t14. The shifting of the automatic transmission 30 may be completed, and as a result, the stage of the automatic transmission 30 may be set to the second stage, at time t15.

Further, in response to the downshift operation performed by the driver, a control that increases the regenerative torque may be performed by the MCU 23 and the inverter 21 in accordance with each command given by the HEVCU 90. In other words, a control based on the instructed motor torque corresponding to the sum value of the requested motor torque and the correction torque may be performed by the MCU 23 and the inverter 21 in accordance with each command given by the HEVCU 90. Further, a control that increases the engine speed may be performed by the ECU 11 in accordance with each command given by the HEVCU 90, also in response to the downshift operation performed by the driver. As a result of the foregoing control performed by the MCU 23, the regenerative torque generated by the electric motor 20 may be increased at the time t14. For example, the regenerative torque generated by the electric motor 20 may be increased from MT10 to MT11 at the time t14. Further, as a result of the foregoing control performed by the ECU 11, the engine speed may be increased at the time t14. For example, the engine speed may be increased from ES10 to ES12 at the time t14. In the example illustrated in FIG. 10, as with the example illustrated in FIG. 2, the engine speed ES12 after the foregoing increase in engine speed may be higher than an engine speed ES11 by a predetermined speed (ES12-ES11). The engine speed ES11 may be an engine speed after the shifting of the automatic transmission 30 into the second stage is completed, and may be higher than the engine speed ES10 before the shifting of the automatic transmission 30 into the second stage is performed.

The regenerative torque MT11 after the increase in regenerative torque may compensate the lack, of torque, caused by the neutral state of the automatic transmission 30. Therefore, the deceleration torque transmitted to the drive wheels 5 may be increased at the time t14 as if the deceleration torque transmitted to the drive wheels 5 is increased in correspondence with the increase in engine braking resulting from the downshift. For example, the deceleration torque transmitted to the drive wheels 5 may be increased from RT10 to RT11 at the time t14. In the example illustrated in FIG. 10, the correction torque may allow the deceleration torque RT11 after the foregoing increase in deceleration torque to be torque that is slightly smaller than the deceleration torque RT12, as a result of the increase in deceleration torque. The deceleration torque RT12 may include torque that is to be generated through engine braking when the shifting of the automatic transmission 30 into the second stage is completed. This deceleration torque RT11 after the increase in deceleration torque may increase the deceleration rate of the vehicle.

As it approaches time t15 at which the shifting of the automatic transmission 30 into the second stage is completed, e.g., when the predetermined time period has elapsed from the time at which the control is started, the regenerative torque may be decreased gradually and the engine speed may be also decreased gradually. On this occasion, the deceleration torque generated through the engine braking may be increased gradually in accordance with the engaging state of the engaging member of the automatic transmission 30. Further, at the time t15, i.e., when the engaging in the automatic transmission 30 by the engaging member is completed and the shifting of the automatic transmission 30 into the second stage is thereby completed, the HEVCU 90 may return to the regular control. In other words, the HEVCU 90 may return to the control based on the instructed motor torque corresponding to the requested motor torque. At the time t15, the regenerative torque based on the regular control, e.g., regenerative torque that is slightly greater than the regenerative torque MT10 at the time when the control is started may be achieved. Further, the engine speed ES11 that is in accordance with the second stage of the automatic transmission 30 and is greater than ES10 may be achieved at the time t15. Further, the deceleration torque generated through the engine braking may be increased at the time t15. The deceleration torque transmitted to the drive wheels 5 may be the deceleration torque RT12 including torque such as the increased deceleration torque generated through the engine braking.

The control apparatus 3 according to the third implementation may have effects similar to those of the control apparatus 1 according to the first implementation. It is to be noted that, in the control apparatus 3 according to the third implementation, when the shift operation is performed by the driver, the deceleration torque transmitted to the drive wheels 5 may be varied promptly after the shift operation is performed, by controlling the regenerative torque generated by the electric motor 20 to be increased on the basis of the correction torque set by means of the correction torque map. Hence, it is possible to improve responsiveness to the shift operation performed by the driver.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the control apparatus for hybrid electric vehicle of one implementation of the technology may be applied to the hybrid electric vehicle provided with the automatic transmission 30 (the step AT) of a planetary gear type or the CVT 70 as the automatic transmission in the description above; however, this is non-limiting. Alternatively, the control apparatus for hybrid electric vehicle of one implementation of the technology may be also applied to a hybrid electric vehicle provided with any other automatic transmission such as a parallel-axes automatic transmission.

For example, the control apparatus for hybrid electric vehicle of one implementation of the technology may be applied to the hybrid electric vehicle that transmits the power from the engine 10 and the power from the electric motor 20 to the same drive wheels 5 to thereby drive the vehicle in the description above; however, this is non-limiting. Alternatively, the control apparatus for hybrid electric vehicle of one implementation of the technology may be also applied to a four-wheel drive hybrid electric vehicle that transmits the power from the engine to either of the front wheels and the rear wheels, and transmits the power from the electric motor to the other of the front wheels and the rear wheels, to thereby drive the vehicle.

For example, the driver's intention, e.g., whether the driver's intention is directed to deceleration or acceleration, may be determined on the basis of the accelerator pedal position detected by the accelerator pedal sensor 41 in the above-described implementations; however, this is non-limiting. The driver's intention may be determined by any other method. In one alternative example, a method may be applied that the driver's intention is determined as being directed to acceleration, i.e., the driver's intention is determined as not being directed to deceleration, on a condition that a change of lane is determined as being performed on the basis of information regarding an operation performed on a direction indicator. In another alternative example, a method may be applied that the driver's intention is determined as being directed to acceleration, i.e., the driver's intention is determined as not being directed to deceleration, on a condition that merging at a merging place such as a freeway is determined as being performed on the basis of image information obtained from a camera capturing an image ahead of the vehicle.

For example, the regenerative torque generated by the electric motor 20 may be used in order to improve responsiveness to the shift operation performed by the driver in the above-described implementations; however, this is non-limiting. In one alternative example, the drive torque generated by the electric motor 20 may be used in order to improve responsiveness to the shift operation performed by the driver.

For example, according to the above-described first implementation, the control of the engine speed may be performed in addition to the control of the regenerative torque in a case where any of the downshift operation and the upshift operation is performed by the driver; however, this is non-limiting. In one alternative example, only the control of the regenerative torque may be performed.

For example, according to the above-described third implementation, the correction torque in accordance with the vehicle speed and the slope of the road surface may be set on the basis of the correction torque map provided for each stage, however, this is non-limiting and any other method of setting the correction torque may be used. In one alternative example, predetermined torque may be prepared in advance for each stage, and the predetermined torque may be set as the correction torque in accordance with the stage.

Each of the ECU 11 illustrated in FIG. 1, the MCU 23 illustrated in FIG. 1, the HEVCU 40 illustrated in FIG. 1, the HEVCU 80 illustrated in FIG. 5, and the HEVCU 90 illustrated in FIG. 8 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the ECU 11 illustrated in FIG. 1, the MCU 23 illustrated in FIG. 1, the HEVCU 40 illustrated in FIG. 1, the HEVCU 80 illustrated in FIG. 5, and the HEVCU 90 illustrated in FIG. 8. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the ECU 11 illustrated in FIG. 1, the MCU 23 illustrated in FIG. 1, the HEVCU 40 illustrated in FIG. 1, the HEVCU 80 illustrated in FIG. 5, and the HEVCU 90 illustrated in FIG. 8.

The invention claimed is:

1. A control apparatus for a hybrid electric vehicle, the control apparatus controlling the hybrid electric vehicle that includes a drive wheel, an engine, an electric motor, and an automatic transmission, the engine and the electric motor both serving as drive sources, the automatic transmission having a manual shift mode that allows for shifting of the automatic transmission in accordance with an input of a shift operation, the control apparatus comprising:
 a shift operation detector configured to detect the input of the shift operation; and
 an electric motor controller configured to control the electric motor to generate a motor torque directed to decreasing of a torque difference, on a condition that:
 the input of the shift operation from a first stage into a second stage is detected by the shift operation detector; and
 a first torque and a second torque are different in magnitude from each other by the torque difference, the first torque including a torque that is to be transmitted to the drive wheel during shifting of the automatic transmission from the first stage into the second stage, the second torque including a torque that is to be transmitted to the drive wheel after the shifting of the automatic transmission from the first stage into the second stage is completed.

2. The control apparatus for hybrid electric vehicle according to claim 1, wherein the electric motor controller controls the electric motor to generate the motor torque directed to increasing, of the first torque, that results in the decreasing of the torque difference, on a condition that:
 the input of the shift operation from the first stage into the second stage is detected by the shift operation detector; and
 the first torque is smaller than the second torque, and
 wherein the electric motor controller controls the electric motor to generate the motor torque directed to decreasing, of the first torque, that results in the decreasing of the torque difference, on a condition that:
 the input of the shift operation from the first stage into the second stage is detected by the shift operation detector; and the first torque is greater than the second torque.

3. The control apparatus for hybrid electric vehicle according to claim 2, further comprising:
 a torque estimating unit configured to estimate the second torque on a condition that the input of the shift operation from the first stage into the second stage is detected by the shift operation detector,
 wherein the electric motor controller controls the electric motor to cause the second torque estimated by the torque estimating unit to be generated during the shifting of the automatic transmission from the first stage into the second stage, on the condition that the input of the shift operation from the first stage into the second stage is detected by the shift operation detector.

4. The control apparatus for hybrid electric vehicle according to claim 2, further comprising:
 a correction torque setting unit configured to seta correction torque on a condition that the input of the shift operation from the first stage into the second stage is detected by the shift operation detector, the correction torque being directed to the decreasing of the torque difference during the shifting of the automatic transmission from the first stage into the second stage,
 wherein the electric motor controller controls the electric motor to generate, during a stage shifting of the automatic transmission from the first stage into the second stage, the motor torque that takes into consideration the correction torque set by the correction torque setting unit, on the condition that the input of the shift operation from the first stage into the second stage is detected by the shift operation detector.

5. The control apparatus for hybrid electric vehicle according to claim 2, wherein the automatic transmission comprises a step automatic transmission that is to be placed into a neutral state during a shifting of the step automatic transmission, and
 wherein the electric motor controller controls the electric motor to increase a regenerative torque by a predetermined amount during the shifting of the step automatic transmission from the first stage into the second stage, on a condition that the input of the shift operation from the first stage into the second stage is detected by the shift operation detector during deceleration of the hybrid electric vehicle.

6. The control apparatus for hybrid electric vehicle according to claim 2, wherein the automatic transmission comprises a continuously variable transmission,
 wherein the electric motor controller controls the electric motor to increase a regenerative torque by a predetermined amount and to decrease, after the increasing of the regenerative torque, the regenerative torque in accordance with a variation in a speed ratio of the continuously variable transmission, on a condition that:
 the input of the shift operation from the first stage into the second stage is detected by the shift operation detector during a deceleration of the hybrid vehicle; and
 the second stage is lower than the first stage, the increasing of the regenerative torque by the predetermined amount and the decreasing of the regenerative torque in accordance with the variation in speed ratio of the continuously variable transmission both being performed during the shifting of the continuously variable transmission from the first stage into the second stage, and
 wherein the electric motor controller controls the electric motor to decrease the regenerative torque by a predetermined amount and to increase, after the decreasing of the regenerative torque, the regenerative torque in accordance with the variation in the speed ratio of the continuously variable transmission, on a condition that:
 the input of the shift operation from the first stage into the second stage is detected by the shift operation detector during the deceleration of the hybrid vehicle;

and the second stage is higher than the first stage, the decreasing of the regenerative torque by the predetermined amount and the increasing of the regenerative torque in accordance with the variation in speed ratio of the continuously variable transmission both being performed during the shifting of the continuously variable transmission from the first stage into the second stage.

7. The control apparatus for hybrid electric vehicle according to claim 2, further comprising:
   an estimated driving action information acquiring unit configured to acquire information regarding an estimated driving action; and
   an estimated driving action determiner configured to determine, on a basis of the information regarding the estimated driving action acquired by the estimated driving action information acquiring unit, whether the estimated driving action is directed to deceleration,
   wherein the electric motor controller controls the electric motor to increase a regenerative torque, on a condition that:
   the input of the shift operation from the first stage into the second stage is detected by the shift operation detector during deceleration of the hybrid vehicle;
   the second stage is lower than the first stage; and
   the estimated driving action is determined by the estimated driving action information acquiring unit as being directed to the deceleration.

8. The control apparatus for hybrid electric vehicle according to claim 2, further comprising:
   an engine controller configured to control the engine to increase an engine speed of the engine during a shifting of the automatic transmission from the first stage into the second stage, on a condition that:
   the input of the shift operation from the first stage into the second stage is detected by the shift operation detector; and
   the second stage is lower than the first stage, and that controls the engine to decrease the engine speed of the engine during the shifting of the automatic transmission from the first stage into the second stage, on a condition that:
   the input of the shift operation from the first stage into the second stage is detected by the shift operation detector; and
   the second stage is higher than the first stage.

9. The control apparatus for hybrid electric vehicle according to claim 1, further comprising:
   a torque estimating unit configured to estimate the second torque on a condition that the input of the shift operation from the first stage into the second stage is detected by the shift operation detector,
   wherein the electric motor controller controls the electric motor to cause the second torque estimated by the torque estimating unit to be generated during the shifting of the automatic transmission from the first stage into the second stage, on the condition that the input of the shift operation from the first stage into the second stage is detected by the shift operation detector.

10. The control apparatus for hybrid electric vehicle according to claim 1, further comprising:
    a correction torque setting unit configured to set a correction torque on a condition that the input of the shift operation from the first stage into the second stage is detected by the shift operation detector, the correction torque being directed to the decreasing of the torque difference during the shifting of the automatic transmission from the first stage into the second stage,
    wherein the electric motor controller controls the electric motor to generate, during a stage shifting of the automatic transmission from the first stage into the second stage, the motor torque that takes into consideration the correction torque set by the correction torque setting unit, on the condition that the input of the shift operation from the first stage into the second stage is detected by the shift operation detector.

11. The control apparatus for hybrid electric vehicle according to claim 1, wherein the automatic transmission comprises a step automatic transmission that is to be placed into a neutral state during a shifting of the step automatic transmission, and
    wherein the electric motor controller controls the electric motor to increase a regenerative torque by a predetermined amount during the shifting of the step automatic transmission from the first stage into the second stage, on a condition that the input of the shift operation from the first stage into the second stage is detected by the shift operation detector during deceleration of the hybrid electric vehicle.

12. The control apparatus for hybrid electric vehicle according to claim 1, wherein the automatic transmission comprises a continuously variable transmission,
    wherein the electric motor controller controls the electric motor to increase a regenerative torque by a predetermined amount and to decrease, after the increasing of the regenerative torque, the regenerative torque in accordance with a variation in a speed ratio of the continuously variable transmission, on a condition that:
    the input of the shift operation from the first stage into the second stage is detected by the shift operation detector during a deceleration of the hybrid vehicle; and
    the second stage is lower than the first stage, the increasing of the regenerative torque by the predetermined amount and the decreasing of the regenerative torque in accordance with the variation in speed ratio of the continuously variable transmission both being performed during the shifting of the continuously variable transmission from the first stage into the second stage, and
    wherein the electric motor controller controls the electric motor to decrease the regenerative torque by a predetermined amount and to increase, after the decreasing of the regenerative torque, the regenerative torque in accordance with the variation in the speed ratio of the continuously variable transmission, on a condition that:
    the input of the shift operation from the first stage into the second stage is detected by the shift operation detector during the deceleration of the hybrid vehicle; and
    the second stage is higher than the first stage, the decreasing of the regenerative torque by the predetermined amount and the increasing of the regenerative torque in accordance with the variation in speed ratio of the continuously variable transmission both being performed during the shifting of the continuously variable transmission from the first stage into the second stage.

13. The control apparatus for hybrid electric vehicle according to claim 1, further comprising:
    an estimated driving action information acquiring unit configured to acquire information regarding an estimated driving action; and
    an estimated driving action determiner configured to determine, on a basis of the information regarding the estimated driving action acquired by the estimated driving action information acquiring unit, whether the estimated driving action is directed to deceleration, wherein the electric motor controller controls the electric motor to increase a regenerative torque, on a condition that:

the input of the shift operation from the first stage into the second stage is detected by the shift operation detector during deceleration of the hybrid vehicle; the second stage is lower than the first stage; and the estimated driving action is determined by the estimated driving action information acquiring unit as being directed to the deceleration.

14. The control apparatus for hybrid electric vehicle according to claim 13, wherein the hybrid electric vehicle further includes an accelerator pedal, and wherein the estimated driving action information acquiring unit comprises an accelerator pedal sensor that detects a position of the accelerator pedal of the hybrid electric vehicle.

15. The control apparatus for hybrid electric vehicle according to claim 1, further comprising:

an engine controller configured to control the engine to increase an engine speed of the engine during a shifting of the automatic transmission from the first stage into the second stage, on a condition that:

the input of the shift operation from the first stage into the second stage is detected by the shift operation detector; and the second stage is lower than the first stage, and that controls the engine to decrease the engine speed of the engine during the shifting of the automatic transmission from the first stage into the second stage, on a condition that:

the input of the shift operation from the first stage into the second stage is detected by the shift operation detector; and the second stage is higher than the first stage.

16. The control apparatus for hybrid electric vehicle according to claim 15, wherein the electric motor controller controls, on a condition that the engine speed is increased by the engine controller, the electric motor to increase a regenerative torque in accordance with an amount of an increase in a drive torque resulting from the increasing of the engine speed.

17. The control apparatus for hybrid electric vehicle according to claim 1, wherein the motor torque generated by the electric motor is transmitted to the drive wheel without being transmitted through the automatic transmission.

18. A control apparatus for a hybrid electric vehicle, the control apparatus controlling the hybrid electric vehicle that includes a drive wheel, an engine, an electric motor, and an automatic transmission, the engine and the electric motor both serving as drive sources, the automatic transmission having a manual shift mode that allows for shifting of the automatic transmission in accordance with an input of a shift operation, the control apparatus comprising:

a circuitry configured to detect the input of the shift operation; and an electric motor controller configured to control the electric motor to generate a motor torque directed to decreasing of a torque difference, on a condition that:

the input of the shift operation from a first Manual shift mode into a second manual shift mode is detected by the circuitry; and a first torque and a second torque are different in magnitude from each other by the torque difference, the first torque including a torque that is to be transmitted to the drive wheel during shifting of the automatic transmission from the first manual shift mode into the second manual shift mode, the second torque including a torque that is to be transmitted to the drive wheel after the shifting of the automatic transmission from the first manual shift mode into the second manual shift mode is completed.

19. A control apparatus for a hybrid electric vehicle, the control apparatus comprising:

a shift operation detector configured to detect an input a shift operation in the hybrid electric vehicle, wherein the hybrid electric vehicle includes a drive wheel, an engine, an electric motor, and an automatic transmission, the engine and the electric motor serving as drive sources, the automatic transmission having a manual shift mode that allows for shifting of the automatic transmission in accordance with the input of the shift operation; and an electric motor controller configured to control the electric motor to generate a motor torque directed to decreasing of a torque difference, on a condition that:

the input of the shift operation from a first stage into a second stage is detected by the shift operation detector; and a first torque and a second torque are different in magnitude from each other by the torque difference, the first torque including a torque that is to be transmitted to the drive wheel during shifting of the automatic transmission from the first stage into the second stage, the second torque including a torque that is to be transmitted to the drive wheel after the shifting of the automatic transmission from the first stage into the second stage is completed.

* * * * *